(12) United States Patent
Li et al.

(10) Patent No.: US 11,169,353 B2
(45) Date of Patent: Nov. 9, 2021

(54) CAMERA LENS ASSEMBLY

(71) Applicant: ZHEJIANG SUNNY OPTICAL CO., LTD., Ningbo (CN)

(72) Inventors: Ming Li, Ningbo (CN); Tianxiang Xing, Ningbo (CN)

(73) Assignee: ZHEJIANG SUNNY OPTICAL CO., LTD.

( * ) Notice: Subject to any disclaimer, the term of this patent is extended or adjusted under 35 U.S.C. 154(b) by 290 days.

(21) Appl. No.: 16/273,806

(22) Filed: Feb. 12, 2019

(65) Prior Publication Data

US 2019/0179101 A1 Jun. 13, 2019

Related U.S. Application Data

(63) Continuation of application No. PCT/CN2018/086539, filed on May 11, 2018.

(30) Foreign Application Priority Data

Sep. 27, 2017 (CN) .......................... 201710889190.0
Sep. 27, 2017 (CN) .......................... 201721249422.8

(51) Int. Cl.
*G02B 9/64* (2006.01)
*G02B 7/02* (2021.01)
*G02B 13/00* (2006.01)
*H04N 5/225* (2006.01)

(52) U.S. Cl.
CPC ............... *G02B 7/021* (2013.01); *G02B 9/64* (2013.01); *G02B 13/0045* (2013.01); *H04N 5/2254* (2013.01)

(58) Field of Classification Search
CPC ...... G02B 7/021; G02B 9/64; G02B 13/0045; H04N 5/2254
USPC .......................................... 359/708, 751, 755
See application file for complete search history.

(56) References Cited

U.S. PATENT DOCUMENTS

2017/0219798 A1* 8/2017 Park .................... G02B 13/0045
2019/0196144 A1* 6/2019 Chen .................... G02B 27/0025

FOREIGN PATENT DOCUMENTS

CN 106842512 A 6/2017
CN 207181799 U 4/2018

* cited by examiner

*Primary Examiner* — William Choi
(74) *Attorney, Agent, or Firm* — Barnes & Thornburg LLP

(57) ABSTRACT

A camera lens assembly is provided. The camera lens assembly includes, from an object side to an image side: a first lens having a positive refractive power, an object-side surface of the first lens being a convex surface; a second lens having a positive refractive power; a third lens having a refractive power; a fourth lens; a fifth lens having a refractive power, an object-side surface of the fifth lens being a concave surface, and an image-side surface of the fifth lens being a convex surface; a sixth lens having a refractive power, an image-side surface of the sixth lens being a concave surface; a seventh lens having a negative refractive power, an image-side surface of the seventh lens being a concave surface. An effective focal length f of the camera lens assembly and an entrance pupil diameter EPD of the camera lens assembly satisfy: f/EPD≤1.60.

23 Claims, 9 Drawing Sheets

CAMERA LENS ASSEMBLY

CROSS-REFERENCE TO RELATED APPLICATIONS

This application is a continuation of International Application NO. PCT/CN2018/086539, filed on May 11, which claims priorities and rights to Chinese Patent Application No. 201710889190.0 filed with the State Intellectual Property Office of China (SIPO) on Sep. 27, 2017 and Chinese Patent Application No. 201721249422.8 filed with the SIPO on Sep. 27, 2017. All of the aforementioned application are hereby incorporated by reference in their entireties.

TECHNICAL FIELD

The present disclosure relates to a camera lens assembly, and more specifically to a camera lens assembly including seven lenses.

BACKGROUND

With the development of science and technology, market demands for product-side imaging lens assemblies have become more diverse. The miniaturization tendency of portable electronic products limits the total length of the lens assembly, thereby increasing the difficulty in designing the lens assembly. To satisfy the miniaturization requirement, a typical configuration of an existing lens assembly has an F-number of 2.0 or above, achieving a reduction in lens assembly size while having good optical performance. However, with the continuous development of the portable electronic products such as smart phones, higher requirements on the imaging lens assemblies have been brought forward, especially in situations such as insufficient light (e.g., cloudy and rainy days, or at dusk) or hand trembling. Therefore, the lens assembly having the F-number of 2.0 or above has been unable to meet the higher imaging requirements.

Therefore, the present disclosure proposes a camera lens assembly having a large aperture, good imaging quality and low sensibility applicable to the portable electronic products.

SUMMARY

To solve at least one of the problems in the existing technology, the present disclosure provides a camera lens assembly.

According to an aspect, the present disclosure provides a camera lens assembly. The camera lens assembly sequentially includes, from an object side to an image side: a first lens having a positive refractive power, and an object-side surface of the first lens being a convex surface; a second lens having a positive refractive power; a third lens having a refractive power; a fourth lens; a fifth lens having a refractive power, an object-side surface of the fifth lens being a concave surface, and an image-side surface of the fifth lens being a convex surface; a sixth lens having a refractive power, and an image-side surface of the sixth lens being a concave surface; a seventh lens having a negative refractive power, and an image-side surface of the seventh lens being a concave surface; and an effective focal length f of the camera lens assembly and an entrance pupil diameter EPD of the camera lens assembly satisfy: $f/EPD \leq 1.60$.

According to an embodiment of the present disclosure, the fourth lens has a refractive power.

According to an embodiment of the present disclosure, an abbe number V2 of the second lens, an abbe number V3 of the third lens, an abbe number V4 of the fourth lens, an abbe number V6 of the sixth lens, and an abbe number V7 of the seventh lens satisfy: $1 < (V2+V7)/(V3+V4+V6) < 2$.

According to an embodiment of the present disclosure, an effective focal length f1 of the first lens and an effective focal length f2 of the second lens satisfy: $1 \leq f1/f2 < 5$.

According to an embodiment of the present disclosure, the entrance pupil diameter EPD of the camera lens assembly and a half ImgH of a diagonal length of an effective pixel area on an image plane satisfy: $EPD/ImgH \geq 0.75$.

According to an embodiment of the present disclosure, a radius R4 of curvature of an image-side surface of the second lens and a radius R7 of curvature of an object-side surface of the fourth lens satisfy: $|(R4-R7)/(R4+R7)| < 1.5$.

According to an embodiment of the present disclosure, a radius R8 of curvature of an image-side surface of the fourth lens and a radius R14 of curvature of the image-side surface of the seventh lens satisfy: $0 < (R8-R14)/(R8+R14) < 2$.

According to an embodiment of the present disclosure, the effective focal length f of the camera lens assembly and an effective focal length f1 of the first lens satisfy: $1.5 < f1/f < 5$.

According to an embodiment of the present disclosure, an axial distance T25 between the second lens and the fifth lens and an axial distance T56 between the fifth lens and the sixth lens satisfy: $0 < T25/T56 < 3.5$.

According to an embodiment of the present disclosure, the effective focal length f of the camera lens assembly and a radius R9 of curvature of the object-side surface of the fifth lens satisfy: $-1 < f/R9 < 0$.

According to an embodiment of the present disclosure, a radius R1 of curvature of the object-side surface of the first lens and the radius R9 of curvature of the object-side surface of the fifth lens satisfy: $-0.5 < R1/R9 < 0$.

According to an embodiment of the present disclosure, the effective focal length f of the camera lens assembly and a radius R12 of curvature of the image-side surface of the sixth lens satisfy: $0 < f/R12 < 1$.

According to an aspect, the present disclosure provides a camera lens assembly. The camera lens assembly sequentially includes, from an object side to an image side: a first lens having a positive refractive power; a second lens having a positive refractive power; a third lens having a refractive power; a fourth lens; a fifth lens having a refractive power; a sixth lens having a refractive power; a seventh lens having a negative refractive power; and an abbe number V2 of the second lens, an abbe number V3 of the third lens, an abbe number V4 of the fourth lens, an abbe number V6 of the sixth lens, and an abbe number V7 of the seventh lens satisfy: $1 < (V2+V7)/(V3+V4+V6) < 2$.

According to an embodiment of the present disclosure, an object-side surface of the first lens is a convex surface; an object-side surface of the fifth lens is a concave surface and an image-side surface of the fifth lens is a convex surface; an image-side surface of the sixth lens is a concave surface; and an image-side surface of the seventh lens is a concave surface.

According to an embodiment of the present disclosure, the fourth lens has a refractive power.

According to an aspect, the present disclosure provides a camera lens assembly. The camera lens assembly sequentially includes, from an object side to an image side: a first lens having a positive refractive power, and an object-side surface of the first lens being a convex surface; a second lens having a positive refractive power; a third lens having a refractive power; a fourth lens; a fifth lens having a refractive power, an object-side surface of the fifth lens being a concave surface, and an image-side surface of the fifth lens being a convex surface; a sixth lens having a refractive power, and an image-side surface of the sixth lens being a concave surface; a seventh lens having a negative refractive power, and an image-side surface of the seventh lens being a concave surface; and an effective focal length f1 of the first lens and an effective focal length f2 of the second lens satisfy: $1 \le -f1/f2 < 5$.

According to an embodiment of the present disclosure, the fourth lens has a refractive power.

According to an aspect, the present disclosure provides a camera lens assembly. The camera lens assembly sequentially includes, from an object side to an image side: a first lens having a positive refractive power, and an object-side surface of the first lens being a convex surface; a second lens having a positive refractive power; a third lens having a refractive power; a fourth lens; a fifth lens having a refractive power, an object-side surface of the fifth lens being a concave surface, and an image-side surface of the fifth lens being a convex surface; a sixth lens having a refractive power, and an image-side surface of the sixth lens being a concave surface; a seventh lens having a negative refractive power, and an image-side surface of the seventh lens being a concave surface; and an entrance pupil diameter EPD of the camera lens assembly and a half ImgH of a diagonal length of an effective pixel area on an image plane satisfy: $EPD/ImgH \ge 0.75$.

According to an aspect, the present disclosure provides a camera lens assembly. The camera lens assembly sequentially includes, from an object side to an image side: a first lens having a positive refractive power, and an object-side surface of the first lens being a convex surface; a second lens having a positive refractive power; a third lens having a refractive power; a fourth lens; a fifth lens having a refractive power, an object-side surface of the fifth lens being a concave surface, and an image-side surface of the fifth lens being a convex surface; a sixth lens having a refractive power, and an image-side surface of the sixth lens being a concave surface; a seventh lens having a negative refractive power, and an image-side surface of the seventh lens being a concave surface; and a radius R8 of curvature of an image-side surface of the fourth lens and a radius R14 of curvature of the image-side surface of the seventh lens satisfy: $0 < (R8-R14)/(R8+R14) < 2$.

According to an aspect, the present disclosure provides a camera lens assembly. The camera lens assembly sequentially includes, from an object side to an image side: a first lens having a positive refractive power, and an object-side surface of the first lens being a convex surface; a second lens having a positive refractive power; a third lens having a refractive power; a fourth lens; a fifth lens having a refractive power, an object-side surface of the fifth lens being a concave surface, and an image-side surface of the fifth lens being a convex surface; a sixth lens having a refractive power, and an image-side surface of the sixth lens being a concave surface; a seventh lens having a negative refractive power, and an image-side surface of the seventh lens being a concave surface; and a radius R4 of curvature of an image-side surface of the second lens and a radius R7 of curvature of an object-side surface of the fourth lens satisfy: $|(R4-R7)/(R4+R7)| < 1.5$.

According to an aspect, the present disclosure provides a camera lens assembly. The camera lens assembly sequentially includes, from an object side to an image side: a first lens having a positive refractive power, and an object-side surface of the first lens being a convex surface; a second lens having a positive refractive power; a third lens having a refractive power; a fourth lens; a fifth lens having a refractive power, an object-side surface of the fifth lens being a concave surface, and an image-side surface of the fifth lens being a convex surface; a sixth lens having a refractive power, and an image-side surface of the sixth lens being a concave surface; a seventh lens having a negative refractive power, and an image-side surface of the seventh lens being a concave surface; and an effective focal length f of the camera lens assembly and an effective focal length f1 of the first lens satisfy: $1.5 < f1/f < 5$.

According to an aspect, the present disclosure provides a camera lens assembly. The camera lens assembly sequentially includes, from an object side to an image side: a first lens having a positive refractive power, and an object-side surface of the first lens being a convex surface; a second lens having a positive refractive power; a third lens having a refractive power; a fourth lens; a fifth lens having a refractive power, an object-side surface of the fifth lens being a concave surface, and an image-side surface of the fifth lens being a convex surface; a sixth lens having a refractive power, and an image-side surface of the sixth lens being a concave surface; a seventh lens having a negative refractive power, and an image-side surface of the seventh lens being a concave surface; and an axial distance T25 between the second lens and the fifth lens and an axial distance T56 between the fifth lens and the sixth lens satisfy: $0 < T25/T56 < 3.5$.

According to an aspect, the present disclosure provides a camera lens assembly. The camera lens assembly sequentially includes, from an object side to an image side: a first lens having a positive refractive power, and an object-side surface of the first lens being a convex surface; a second lens having a positive refractive power; a third lens having a refractive power; a fourth lens; a fifth lens having a refractive power, an object-side surface of the fifth lens being a concave surface, and an image-side surface of the fifth lens being a convex surface; a sixth lens having a refractive power, and an image-side surface of the sixth lens being a concave surface; a seventh lens having a negative refractive power, and an image-side surface of the seventh lens being a concave surface; and an effective focal length f of the camera lens assembly and a radius R9 of curvature of the object-side surface of the fifth lens satisfy: $-1 < f/R9 < 0$.

According to an aspect, the present disclosure provides a camera lens assembly. The camera lens assembly sequentially includes, from an object side to an image side: a first lens having a positive refractive power, and an object-side surface of the first lens being a convex surface; a second lens having a positive refractive power; a third lens having a refractive power; a fourth lens; a fifth lens having a refractive power, an object-side surface of the fifth lens being a concave surface, and an image-side surface of the fifth lens being a convex surface; a sixth lens having a refractive power, and an image-side surface of the sixth lens being a concave surface; a seventh lens having a negative refractive power, and an image-side surface of the seventh lens being a concave surface; and a radius R1 of curvature of the object-side surface of the first lens and a radius R9 of curvature of the object-side surface of the fifth lens satisfy: $-0.5 < R1/R9 < 0$.

According to an aspect, the present disclosure provides a camera lens assembly. The camera lens assembly sequentially includes, from an object side to an image side: a first lens having a positive refractive power, and an object-side surface of the first lens being a convex surface; a second lens having a positive refractive power; a third lens having a refractive power; a fourth lens; a fifth lens having a refractive power, an object-side surface of the fifth lens being a concave surface, and an image-side surface of the fifth lens being a convex surface; a sixth lens having a refractive power, and an image-side surface of the sixth lens being a concave surface; a seventh lens having a negative refractive power, and an image-side surface of the seventh lens being a concave surface; and an effective focal length f of the camera lens assembly and a radius R12 of curvature of the image-side surface of the sixth lens satisfy: 0<f/R12<1.

The camera lens assembly according to the present disclosure may be applicable to portable electronic products and is an optical system having a large aperture, good imaging quality, and low sensitivity.

BRIEF DESCRIPTION OF THE DRAWINGS

By describing non-limiting embodiments below in detail with reference to the accompanying drawings, other features, objectives and advantages of the present disclosure will be more apparent. In the accompanying drawings.

DETAILED DESCRIPTION OF EMBODIMENTS

Figure 1:
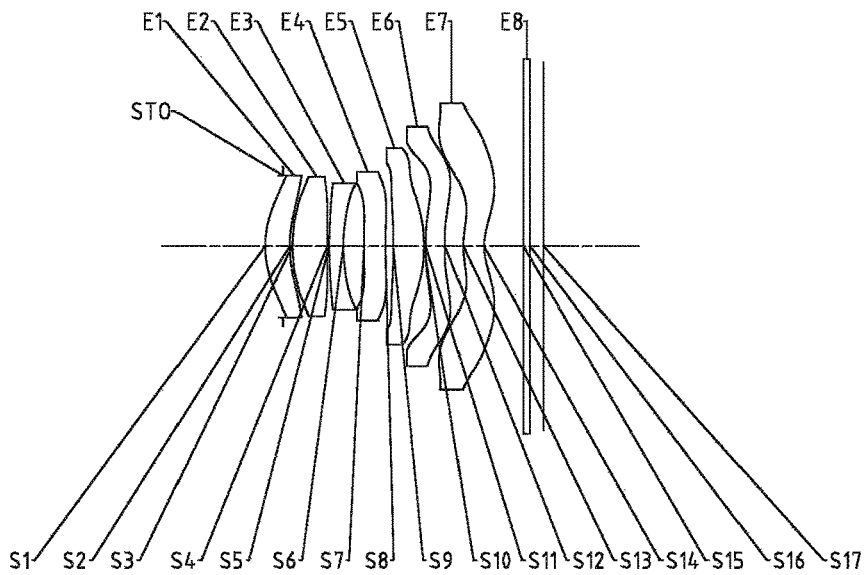
FIG. 1 is a schematic structural diagram illustrating a camera lens assembly according to Embodiment 1.

The present disclosure will be described in more detail below with reference to the accompanying drawings and the embodiments. It may be understood that the specific embodiments described herein are merely illustrative of the present disclosure rather than limitations to the present disclosure. In addition, it should also be noted that, for the convenience of description, only the parts related to the present disclosure are shown in the accompanying drawings.

It should be understood that in the present disclosure, an element or layer may be directly on another element or layer, or directly connected to or coupled to another element or layer, or there may be an intervening element or layer, when the element or layer is described as being "on," "connected to," or "coupled to" another element or layer. When an element is referred to as being "directly on," "directly connected to," or "directly coupled to" another element or layer, there are no intervening elements or layers. Throughout the specification, identical reference numerals refer to the same elements. The expression "and/or" used in this text includes any and all combinations of one or more of the associated listed items.

It should be understood that although the terms $1^{st}$, $2^{nd}$, or first, second, etc. may be used herein to describe various elements, components, areas, layers, and/or sections, these elements, components, areas, layers, and/or sections should not be limited by these terms. These terms are only used to distinguish one element, component, area, layer, or section from another element, component, area, layer, or section. Thus, the first element, component, area, layer, or section discussed below may be termed as the second element, component, area, layer, or section without departing from the teachings of the present disclosure.

The terminology used herein is for the purpose of describing specific implementations only and is not intended to limit the present disclosure. As used herein, unless explicitly stated otherwise in the context, a term includes singular and plural meanings. It should be further understood that the terms "comprising," "including," "having," and variants thereof, when used in this specification, specify the presence of stated features, entireties, steps, operations, elements and/or components, but do not exclude the presence or addition of one or more other features, entireties, steps, operations, elements, components and/or combinations thereof. As used herein, the term "and/or" includes any and all combinations of one or more of the associated listed items. Expressions, such as "at least one of," when preceding a list of elements, modify the entire list of elements rather than the individual element in the list. Further, the use of "may," when describing the implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

The present disclosure provides a camera lens assembly. The camera lens assembly sequentially includes, from an object side to an image side: a first lens having a positive refractive power, and an object-side surface of the first lens being a convex surface; a second lens having a positive refractive power; a third lens having a refractive power; a fourth lens; a fifth lens having a refractive power, an object-side surface of the fifth lens being a concave surface, and an image-side surface of the fifth lens being a convex surface; a sixth lens having a refractive power, and an image-side surface of the sixth lens being a concave surface; a seventh lens having a negative refractive power, and an image-side surface of the seventh lens being a concave surface.

In an embodiment of the present disclosure, the fourth lens may have a refractive power.

In an embodiment of the present disclosure, an abbe number V2 of the second lens, an abbe number V3 of the third lens, an abbe number V4 of the fourth lens, an abbe number V6 of the sixth lens, and an abbe number V7 of the seventh lens satisfy: $1<(V2+V7)/(V3+V4+V6)<2$, specifically, satisfy: $1.12 \leq (V2+V7)/(V3+V4+V6) \leq 1.83$. The camera lens assembly satisfying the above relationship has a large relative aperture, may obtain a good shooting effect, satisfies specification effects of the existing electronic products, and can correct a chromatic aberration of the lens assembly by mutual cooperation between different materials.

In an embodiment of the present disclosure, an entrance pupil diameter EPD of the camera lens assembly and a half ImgH of a diagonal length of an effective pixel area on an image plane satisfy: $EPD/ImgH \geq 0.75$, specifically, satisfy: $EPD/ImgH \geq 0.76$. By satisfying the above relationship, the lens assembly can maintain miniaturization to achieve large aperture and high imaging quality shooting.

In an embodiment of the present disclosure, an effective focal length f of the camera lens assembly and the entrance pupil diameter EPD of the camera lens assembly satisfy: $f/EPD \leq 1.60$, specifically, satisfy: $f/EPD \leq 1.58$. The camera lens assembly satisfying the above relationship has a large relative aperture, may obtain a good shooting effect, satisfies the specification effects of the existing electronic products, and can correct the chromatic aberration of the lens assembly by mutual cooperation between different materials.

In an embodiment of the present disclosure, a radius R8 of curvature of an image-side surface of the fourth lens and a radius R14 of curvature of the image-side surface of the seventh lens satisfy: $0<(R8-R14)/(R8+R14)<2$, specifically, satisfy: $0.72 \leq (R8-R14)/(R8+R14) \leq 1.04$. By satisfying the above relationship, aberrations such as astigmatism and distortion of the imaging system can be effectively corrected, and it is advantageous to match the chief ray angle of the chip.

In an embodiment of the present disclosure, a radius R4 of curvature of an image-side surface of the second lens and a radius R7 of curvature of an object-side surface of the fourth lens satisfy: $|(R4-R7)/(R4+R7)| \leq 1.5$, specifically, satisfy: $|(R4-R7)/(R4+R7)| \leq 1.30$. By satisfying the above relationship, the spherical aberration is balanced, the coma is reduced, and a large change in the peripheral slope is avoided, thereby reducing the generation of stray light.

In an embodiment of the present disclosure, the effective focal length f of the camera lens assembly and an effective focal length f1 of the first lens satisfy: $1.5<f1/f<5$, specifically, satisfy: $1.91 \leq f1/f \leq 4.70$. By satisfying the above relationship, the light deflection angle is reduced, aberrations of the lens assembly are corrected, the tolerance sensitivity is reduced, and stray light is avoided.

In an embodiment of the present disclosure, the effective focal length f1 of the first lens and an effective focal length f2 of the second lens satisfy: $1 \leq f1/f2<5$, specifically, satisfy: $1.08 \leq f1/f2 \leq 4.21$. The camera lens assembly satisfying the above relationship can correct aberrations and reduce sensitivity by setting the refractive powers.

In an embodiment of the present disclosure, an axial distance T25 between the second lens and the fifth lens and an axial distance T56 between the fifth lens and the sixth lens satisfy: $0<T25/T56<3.5$, specifically, satisfy: $0.31 \leq T25/T56 \leq 1.00$. By satisfying the above relationship, the TTL is effectively controlled, the miniaturization is realized, and a peripheral aberration is corrected, to further improve the imaging quality, and the problem of poor lens formation is effectively avoided.

In an embodiment of the present disclosure, the effective focal length f of the camera lens assembly and a radius R9 of curvature of the object-side surface of the fifth lens satisfy: $-1<f/R9<0$, specifically, satisfy: $-0.79 \leq f/R9 \leq -0.04$. The camera lens assembly satisfying the above relationship can reasonably control the radius of curvature of the object-side surface of the fifth lens, improve the trend of light on the fifth lens, improve the relative illumination, and may effectively correct the astigmatism.

In an embodiment of the present disclosure, a radius R1 of curvature of the object-side surface of the first lens and the radius R9 of curvature of the object-side surface of the fifth lens satisfy: $-0.5<R1/R9<0$, specifically, satisfy: $-0.37 \leq R1/R9 \leq -0.02$. Satisfying the above conditional expression is beneficial to balancing an advanced spherical aberration of the system and reducing the sensitivity of the field-of-view in the central area of the system.

In an embodiment of the present disclosure, the effective focal length f of the camera lens assembly and a radius R12 of curvature of the image-side surface of the sixth lens satisfy: $0<f/R12<1$, specifically, satisfy: $0.31 \leq f/R12 \leq 0.92$. By satisfying the above relationship, the radius of curvature of the image-side surface of the sixth lens can be reasonably controlled, the trend of light on the sixth lens is improved, the relative illumination is improved, and the astigmatism may be effectively corrected.

The present disclosure is further described in detail below in combination with the specific embodiments.

Embodiment 1

First, a camera lens assembly according to Embodiment 1 of the present disclosure is described with reference to FIGS. 1 to 5.

FIG. 1 is a schematic structural diagram illustrating the camera lens assembly according to Embodiment 1. As shown in FIG. 1, the camera lens assembly includes seven lenses. The seven lenses are respectively a first lens E1 having an object-side surface S1 and an image-side surface S2, a second lens E2 having an object-side surface S3 and an image-side surface S4, a third lens E3 having an object-side surface S5 and an image-side surface S6, a fourth lens E4 having an object-side surface S7 and an image-side surface S8, a fifth lens E5 having an object-side surface S9 and an image-side surface S10, a sixth lens E6 having an object-side surface S11 and an image-side surface S12 and a seventh lens E7 having an object-side surface S13 and an image-side surface S14. The first to seventh lenses E1 to E7 are sequentially arranged from an object side to an image side of the camera lens assembly.

The first lens E1 may have a positive refractive power, the object-side surface S1 of the first lens E1 may be a convex surface, and the image-side surface S2 of the first lens E1 is a concave surface.

The second lens E2 may have a negative refractive power, the object-side surface S3 of the second lens E2 may be a convex surface, and the image-side surface S4 of the second lens E2 may be a concave surface.

The third lens E3 may have a negative refractive power, the object-side surface S5 of the third lens E3 may be a convex surface, and the image-side surface S6 of the third lens E3 may be a concave surface.

The fourth lens E4 may have a negative refractive power, the object-side surface S7 of the fourth lens E4 may be a convex surface, and the image-side surface S8 of the fourth lens E4 may be a concave surface.

The fifth lens E5 may have a positive refractive power, the object-side surface S9 of the fifth lens E5 may be a concave surface, and the image-side surface S10 of the fifth lens E5 may be a convex surface.

The sixth lens E6 may have a positive refractive power, the object-side surface S11 of the sixth lens E6 may be a convex surface, and the image-side surface S12 of the sixth lens E6 may be a concave surface.

The seventh lens E7 may have a negative refractive power, the object-side surface S13 of the seventh lens E7 may be a convex surface, and the image-side surface S14 of the seventh lens E7 may be a concave surface.

The camera lens assembly further includes an optical filter E8 having an object-side surface S15 and an image-side surface S16 for filtering infrared light. In the present embodiment, light from an object passes through the surfaces S1 to S16 sequentially and is finally imaged on the image plane S17.

In the present embodiment, the first to seventh lenses E1 to E7 have respective effective focal lengths f1 to f7. The first lens E1 to the seventh lens E7 are sequentially arranged along an optical axis and collectively determine the total effective focal length f of the camera lens assembly. Table 1 below shows the effective focal lengths f1 to f7 of the first to seventh lenses E1 to E7, the total effective focal length f of the camera lens assembly, the total track length TTL (mm) of the camera lens assembly, and the half ImgH of the diagonal length of the effective pixel area of the electronic light sensing element.

TABLE 1

| f1(mm) | 9.86   | f(mm)    | 3.74 |
|--------|--------|----------|------|
| f2(mm) | 4.80   | TTL(mm)  | 4.70 |
| f3(mm) | −9.11  | ImgH(mm) | 3.05 |
| f4(mm) | −17.77 |          |      |
| f5(mm) | 6.33   |          |      |
| f6(mm) | 29.81  |          |      |
| f7(mm) | −6.03  |          |      |

Table 2 shows the surface type, the radius of curvature, the thickness, the material and the conic coefficient of each lens of the camera lens assembly in the present embodiment. The units of the radius of curvature and the thickness are millimeters (mm).

TABLE 2

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.2998 | | | |
| S1  | aspheric  | 1.7115   | 0.4162  | 1.55 | 56.1 | −0.6104 |
| S2  | aspheric  | 2.2925   | 0.0400  |      |      | −4.9072 |
| S3  | spherical | 2.6040   | 0.5952  | 1.55 | 56.1 | 0.0000 |
| S4  | aspheric  | 330.8766 | 0.0300  |      |      | −79.9000 |
| S5  | aspheric  | 4.8019   | 0.2400  | 1.67 | 20.4 | −31.7679 |
| S6  | aspheric  | 2.6294   | 0.3524  |      |      | 3.5407 |
| S7  | aspheric  | 10.7937  | 0.3603  | 1.67 | 20.4 | 63.0000 |
| S8  | aspheric  | 5.5758   | 0.1333  |      |      | −79.9000 |
| S9  | aspheric  | −100.0000| 0.5193  | 1.55 | 56.1 | 63.0000 |
| S10 | aspheric  | −3.3483  | 0.0300  |      |      | −7.4104 |
| S11 | aspheric  | 4.5535   | 0.3240  | 1.64 | 24.1 | −79.9000 |
| S12 | aspheric  | 5.8113   | 0.3022  |      |      | −10.4080 |
| S13 | aspheric  | 1.4490   | 0.3509  | 1.54 | 55.7 | −9.3085 |
| S14 | aspheric  | 0.9167   | 0.6694  |      |      | −4.8325 |
| S15 | spherical | infinite | 0.1100  | 1.52 | 64.2 | |
| S16 | spherical | infinite | 0.2266  |      |      | |
| S17 | spherical | infinite |         |      |      | |

In the present embodiment, the aspheric lens may be used for each lens, and the surface type x of each aspheric surface is defined by the following formula:

$$x = \frac{ch^2}{1+\sqrt{1-(k+1)c^2h^2}} + \sum A_i h^i \qquad (1)$$

Here, x is the sag to the aspheric vertex, when the aspheric surface is at height h from the optical axis; c is the paraxial curvature of the aspheric surface, and c=1/R (i.e., the paraxial curvature c is the reciprocal of the radius R of curvature in Table 1 above); k is the conic coefficient (given in Table 2 above); and Ai is the correction coefficient of the $i^{th}$ order of the aspheric surface.

Table 3 below shows the high-order coefficients applicable to the aspheric surfaces S1-S14 of the aspheric lenses in the present embodiment.

TABLE 3

| surface number | A4 | A6 | A8 | A10 | A12 | A14 | A16 | A18 |
|---|---|---|---|---|---|---|---|---|
| S1 | −1.0860E−02 | 4.7760E−03 | −4.3650E−02 | 5.0083E−02 | −3.8110E−02 | 1.1820E−02 | −4.9000E−04 | 0.0000E+00 |
| S2 | 1.4477E−02 | −3.6550E−02 | −9.5000E−04 | −5.0800E−03 | 6.5630E−03 | 0.0000E+00 | 0.0000E+00 | 0.0000E+00 |
| S4 | −8.5490E−02 | 2.8990E−01 | −4.3572E−01 | 2.1934E−01 | 4.7103E−02 | −8.2970E−02 | 2.2087E−02 | 0.0000E+00 |
| S5 | −1.2135E−01 | 3.0222E−01 | −3.7841E−01 | 5.3567E−02 | 2.7570E−01 | −2.0641E−01 | 4.6009E−02 | 0.0000E+00 |
| S6 | −1.1447E−01 | 6.7294E−02 | 1.3682E−01 | −5.8444E−01 | 8.3783E−01 | −5.5230E−01 | 1.5137E−01 | 0.0000E+00 |
| S7 | −1.4576E−01 | 8.8055E−02 | −1.4886E−01 | 5.9521E−02 | 0.0000E+00 | 0.0000E+00 | 0.0000E+00 | 0.0000E+00 |
| S8 | −1.6728E−01 | 2.3668E−01 | −2.3850E−01 | 7.7323E−02 | 0.0000E+00 | 0.0000E+00 | 0.0000E+00 | 0.0000E+00 |
| S9 | −2.4545E−01 | 5.0481E−01 | −4.4030E−01 | 1.8682E−01 | −3.3040E−02 | 0.0000E+00 | 0.0000E+00 | 0.0000E+00 |
| S10 | −3.0750E−01 | 6.7926E−01 | −1.0158E+00 | 1.0332E+00 | −6.3711E−01 | 2.2836E−01 | −4.4220E−02 | 3.5925E−03 |
| S11 | 1.3185E−01 | −1.3514E−01 | −2.3280E−01 | 8.0988E−02 | −5.3150E−02 | 1.5509E−02 | −1.6600E−03 | −3.6442E−06 |
| S12 | 1.2396E−01 | −1.7932E−01 | 8.6912E−02 | −2.3740E−02 | 1.6270E−03 | 1.0230E−03 | −2.6000E−04 | 1.7297E−05 |
| S13 | −4.2169E−01 | 2.5686E−01 | −1.1652E−01 | 4.7170E−02 | −1.3450E−02 | 2.2990E−03 | −2.1000E−04 | 7.8193E−06 |
| S14 | −2.6144E−01 | 1.8308E−01 | −1.0266E−01 | 4.1244E−02 | −1.0530E−02 | 1.5770E−03 | −1.2000E−04 | 3.9880E−06 |

Figure 2:
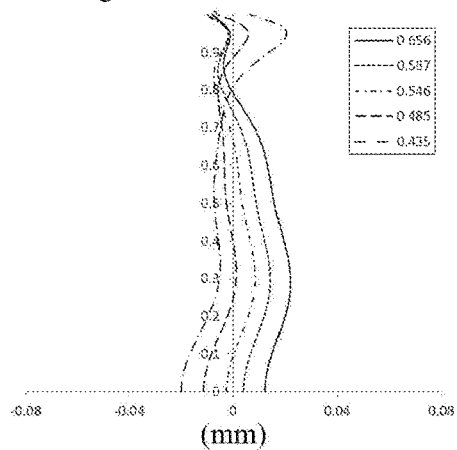
FIGS. 2-5 respectively illustrate a longitudinal aberration curve, an astigmatic curve, a distortion curve and a lateral color curve of the camera lens assembly according to Embodiment 1.
Figure 3:
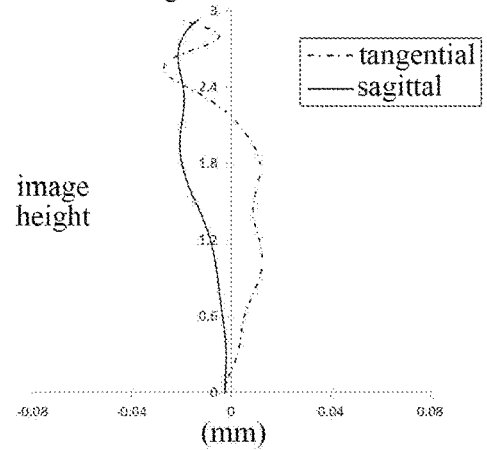
Figure 4:
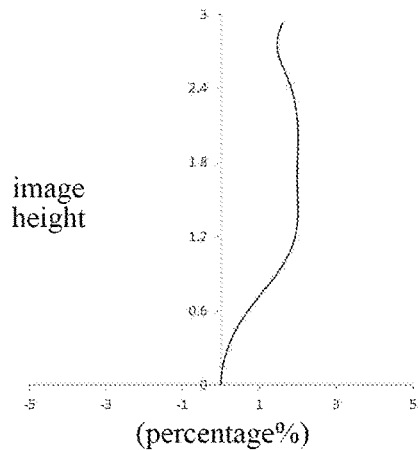
Figure 5:
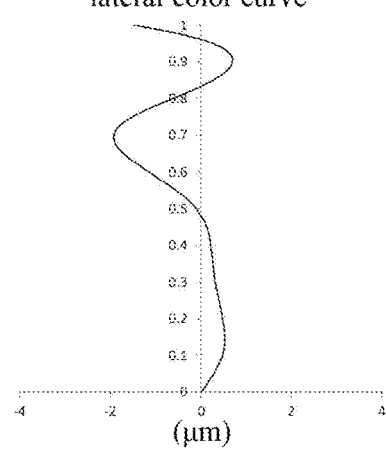

FIG. 2 shows the longitudinal aberration curve of the camera lens assembly according to Embodiment 1, representing deviations of focal points where lights of different wavelengths converge after passing through the optical system. FIG. 3 shows the astigmatic curve of the camera lens assembly according to Embodiment 1, representing a curvature of the tangential image plane and a curvature of the sagittal image plane. FIG. 4 shows the distortion curve of the camera lens assembly according to Embodiment 1, representing degrees of distortion at different viewing angles. FIG. 5 shows the lateral color curve of the camera lens assembly according to Embodiment 1, representing deviations of different heights of images formed on the image plane by light passing through the camera lens assembly. In summary, as can be seen with reference to FIGS. 2 to 5, the camera lens assembly according to Embodiment 1 is suitable for a portable electronic product and having a large aperture, good imaging quality, and low sensitivity.

Embodiment 2

A camera lens assembly according to Embodiment 2 of the present disclosure is described with reference to FIGS. 6 to 10.

Figure 6:
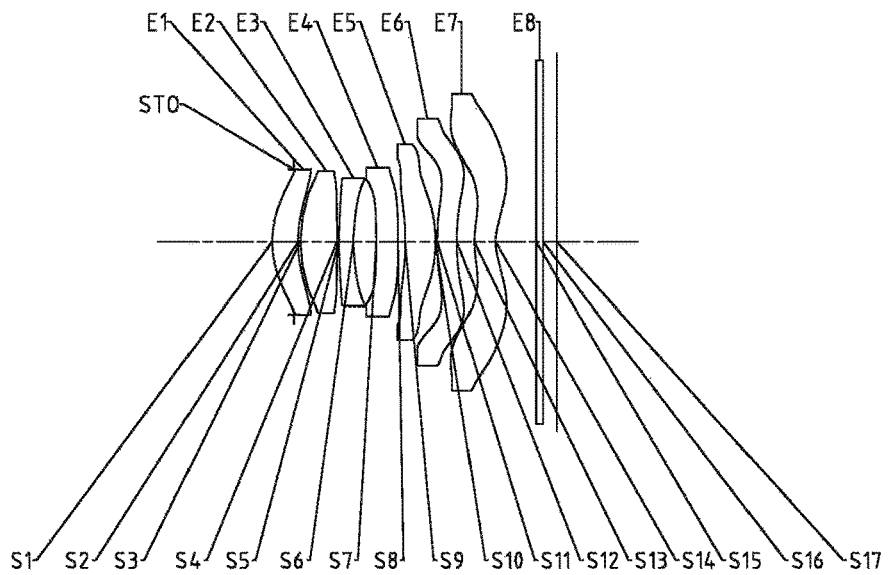
FIG. 6 is a schematic structural diagram illustrating a camera lens assembly according to Embodiment 2.

FIG. 6 is a schematic structural diagram illustrating the camera lens assembly according to Embodiment 2. As shown in FIG. 6, the camera lens assembly includes seven lenses. The seven lenses are respectively a first lens E1 having an object-side surface S1 and an image-side surface S2, a second lens E2 having an object-side surface S3 and an image-side surface S4, a third lens E3 having an object-side surface S5 and an image-side surface S6, a fourth lens E4 having an object-side surface S7 and an image-side surface S8, a fifth lens E5 having an object-side surface S9 and an image-side surface S10, a sixth lens E6 having an object-side surface S11 and an image-side surface S12 and a seventh lens E7 having an object-side surface S13 and an image-side surface S14. The first to seventh lenses E1 to E7 are sequentially arranged from an object side to an image side of the camera lens assembly.

The first lens E1 may have a positive refractive power, the object-side surface S1 of the first lens E1 may be a convex surface, and the image-side surface S2 of the first lens E1 is a concave surface.

The second lens E2 may have a positive refractive power, the object-side surface S3 of the second lens E2 may be a convex surface, and the image-side surface S4 of the second lens E2 may be a concave surface.

The third lens E3 may have a negative refractive power, the object-side surface S5 of the third lens E3 may be a convex surface, and the image-side surface S6 of the third lens E3 may be a concave surface.

The fourth lens E4 may have a negative refractive power, the object-side surface S7 of the fourth lens E4 may be a concave surface, and the image-side surface S8 of the fourth lens E4 may be a convex surface.

The fifth lens E5 may have a positive refractive power, the object-side surface S9 of the fifth lens E5 may be a concave surface, and the image-side surface S10 of the fifth lens E5 may be a convex surface.

The sixth lens E6 may have a positive refractive power, the object-side surface S11 of the sixth lens E6 may be a convex surface, and the image-side surface S12 of the sixth lens E6 may be a concave surface.

The seventh lens E7 may have a negative refractive power, the object-side surface S13 of the seventh lens E7 may be a convex surface, and the image-side surface S14 of the seventh lens E7 may be a concave surface.

The camera lens assembly further includes an optical filter E8 having an object-side surface S15 and an image-side surface S16 for filtering infrared light. In the present embodiment, light from an object passes through the surfaces S1 to S16 sequentially and is finally imaged on the image plane S17.

Table 4 below shows the effective focal lengths f1 to f7 of the first to seventh lenses E1 to E7, the total effective focal length f of the camera lens assembly, the total track length TTL of the camera lens assembly, and the half of the diagonal length ImgH of the effective pixel area of the electronic light sensing element.

TABLE 4

| f1(mm | 10.27 | f(mm) | 3.78 |
|---|---|---|---|
| f2(mm) | 4.59 | TTL(mm) | 4.70 |
| f3(mm) | −9.77 | ImgH(mm) | 3.10 |
| f4(mm) | −72.91 | | |

TABLE 4-continued

| | |
|---|---|
| f5(mm) | 8.68 |
| f6(mm) | 65.51 |
| f7(mm) | −6.26 |

Table 5 shows the surface type, the radius of curvature, the thickness, the material and the conic coefficient of each lens of the camera lens assembly in the present embodiment. The units of the radius of curvature and the thickness are millimeters (mm).

TABLE 5

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.3583 | | | |
| S1 | aspheric | 1.6782 | 0.4274 | 1.55 | 56.1 | −0.5549 |
| S2 | aspheric | 2.1781 | 0.0400 | | | −4.3518 |
| S3 | spherical | 2.5066 | 0.6046 | 1.55 | 56.1 | 0.0000 |
| S4 | aspheric | 23133.5600 | 0.0300 | | | −79.9000 |
| S5 | aspheric | 4.6401 | 0.2400 | 1.67 | 20.4 | −42.9997 |
| S6 | aspheric | 2.6548 | 0.3793 | | | 3.3818 |
| S7 | aspheric | −48.0866 | 0.3600 | 1.66 | 20.4 | 63.0000 |
| S8 | aspheric | −4000.0000 | 0.1193 | | | −79.9000 |
| S9 | aspheric | −7.6605 | 0.5019 | 1.55 | 56.1 | −79.9000 |
| S10 | aspheric | −2.9980 | 0.0300 | | | −6.4771 |
| S11 | aspheric | 4.3633 | 0.3240 | 1.55 | 56.1 | −79.9000 |
| S12 | aspheric | 4.8384 | 0.2800 | | | −8.5684 |
| S13 | aspheric | 1.4627 | 0.3528 | 1.54 | 55.7 | −9.1886 |
| S14 | aspheric | 0.9336 | 0.6738 | | | −5.1760 |
| S15 | spherical | infinite | 0.1100 | 1.52 | 64.2 | |
| S16 | spherical | infinite | 0.2266 | | | |
| S17 | spherical | infinite | | | | |

Table 6 below shows the high-order coefficients applicable to the aspheric surfaces S1-S14 of the aspheric lenses in the present embodiment. The surface type of each aspheric surface may be defined by the formula (1) given in the above Embodiment 1.

TABLE 6

| surface number | A4 | A6 | A8 | A10 | A12 | A14 | A16 | A18 |
|---|---|---|---|---|---|---|---|---|
| S1 | −1.1650E−02 | 1.3133E−02 | −6.0300E−02 | 7.2889E−02 | −5.2120E−02 | 1.5452E−02 | −9.0000E−04 | 0.0000E+00 |
| S2 | 1.9591E−02 | −4.3890E−02 | 1.5813E−02 | −1.9316E−02 | 1.0100E−02 | 0.0000E+00 | 0.0000E+00 | 0.0000E+00 |
| S4 | −9.7580E−02 | 3.5840E−01 | −6.2516E−01 | 5.4087E−01 | −2.5738E−01 | 6.4942E−02 | −6.8400E−03 | 0.0000E+00 |
| S5 | −1.3683E−01 | 4.0966E−01 | −7.5766E−01 | 7.4885E−01 | −4.1729E−01 | 1.5028E−01 | −2.8320E−02 | 0.0000E+00 |
| S6 | −1.2584E−01 | 8.1901E−02 | 9.4985E−02 | −5.6706E−01 | 8.9628E−01 | −6.3036E−01 | 1.8046E−01 | 0.0000E+00 |
| S7 | −9.8030E−02 | 2.8953E−02 | −1.1637E−01 | 5.7212E−02 | 0.0000E+00 | 0.0000E+00 | 0.0000E+00 | 0.0000E+00 |
| S8 | −1.6928E−01 | 2.3987E−01 | −2.2721E−01 | 7.6138E−02 | 0.0000E+00 | 0.0000E+00 | 0.0000E+00 | 0.0000E+00 |
| S9 | −2.5935E−01 | 5.4254E−01 | −4.6996E−01 | 2.0470E−01 | −3.7800E−02 | 0.0000E+00 | 0.0000E+00 | 0.0000E+00 |
| S10 | −3.3880E−01 | 7.6048E−01 | −1.0867E+00 | 1.0270E+00 | −5.9106E−01 | 2.0010E−01 | −3.7140E−02 | 2.9400E−03 |
| S11 | 9.3687E−02 | −3.2950E−02 | −1.6835E−01 | 1.7529E−01 | −7.4290E−02 | 1.0567E−02 | 1.5220E−03 | −4.2000E−04 |
| S12 | 1.0608E−01 | −9.5350E−02 | −3.9900E−02 | 7.6127E−02 | −4.3450E−02 | 1.2505E−02 | −1.7800E−03 | 9.8200E−05 |
| S13 | −4.2222E−01 | 3.5408E−01 | −2.1998E−01 | 9.2229E−02 | −2.3390E−02 | 3.4030E−03 | −2.6000E−04 | 7.6400E−06 |
| S14 | −2.4566E−01 | 1.8940E−01 | −1.1366E−01 | 4.4411E−02 | −1.0350E−02 | 1.3510E−03 | −8.8000E−05 | 2.0600E−06 |

Figure 7:
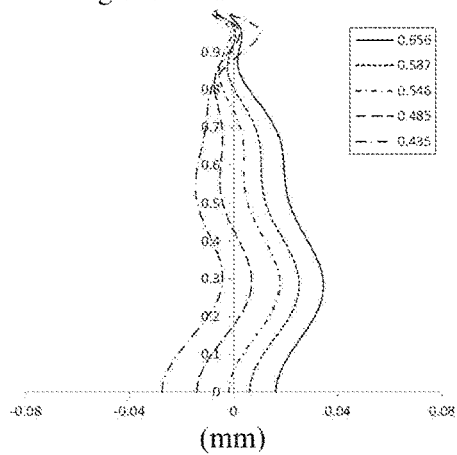
FIGS. 7-10 respectively illustrate a longitudinal aberration curve, an astigmatic curve, a distortion curve and a lateral color curve of the camera lens assembly according to Embodiment 2.
Figure 8:
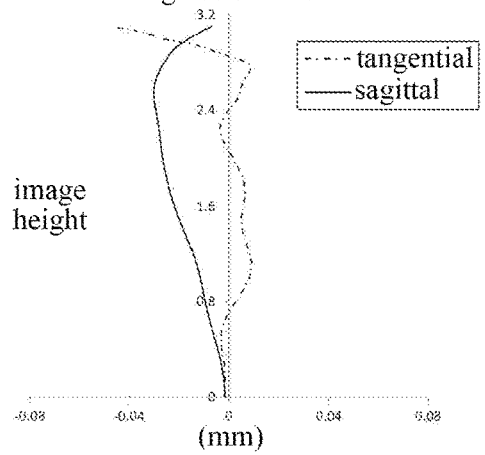
Figure 9:
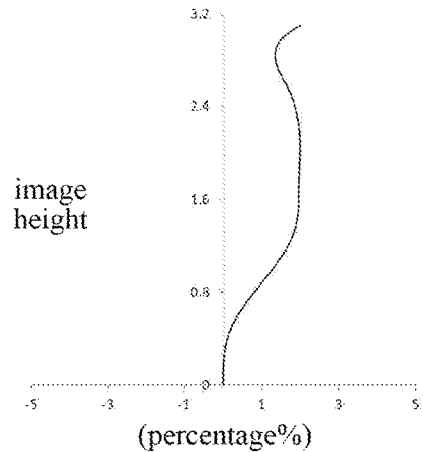
Figure 10:
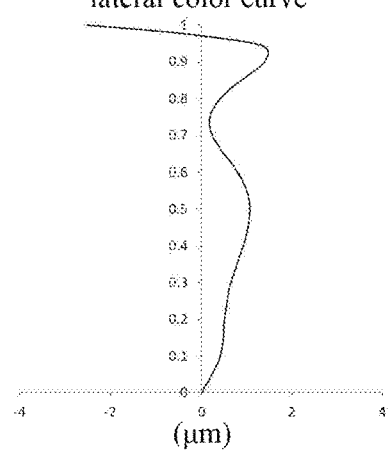

FIG. 7 shows the longitudinal aberration curve of the camera lens assembly according to Embodiment 2, representing deviations of focal points where lights of different wavelengths converge after passing through the optical system. FIG. 8 shows the astigmatic curve of the camera lens assembly according to Embodiment 2, representing a curvature of the tangential image plane and a curvature of the sagittal image plane. FIG. 9 shows the distortion curve of the camera lens assembly according to Embodiment 2, representing degrees of distortion at different viewing angles. FIG. 10 shows the lateral color curve of the camera lens assembly according to Embodiment 2, representing deviations of different heights of images formed on the image plane by light passing through the camera lens assembly. In summary, as can be seen with reference to FIGS. 7 to 10, the camera lens assembly according to Embodiment 2 is suitable for a portable electronic product and having a large aperture, good imaging quality, and low sensitivity.

Embodiment 3

A camera lens assembly according to Embodiment 3 of the present disclosure is described with reference to FIGS. 11 to 15.

Figure 11:
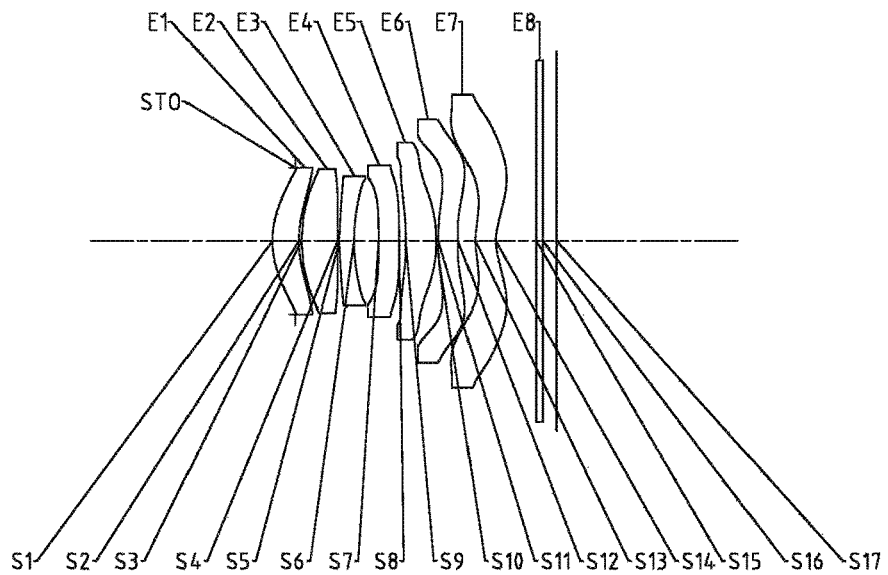
FIG. 11 is a schematic structural diagram illustrating a camera lens assembly according to Embodiment 3.

FIG. 11 is a schematic structural diagram illustrating the camera lens assembly according to Embodiment 3. The camera lens assembly includes, sequentially from an object side to an image side, a first lens E1, a second lens E2, a third lens E3, a fourth lens E4, a fifth lens E5, a sixth lens E6, and a seventh lens E7.

The first lens E1 may have a positive refractive power, the object-side surface S1 of the first lens E1 may be a convex surface, and the image-side surface S2 of the first lens E1 is a concave surface.

The second lens E2 may have a positive refractive power, the object-side surface S3 of the second lens E2 may be a convex surface, and the image-side surface S4 of the second lens E2 may be a concave surface.

The third lens E3 may have a negative refractive power, the object-side surface S5 of the third lens E3 may be a convex surface, and the image-side surface S6 of the third lens E3 may be a concave surface.

The fourth lens E4 may have a negative refractive power, the object-side surface S7 of the fourth lens E4 may be a concave surface, and the image-side surface S8 of the fourth lens E4 may be a convex surface.

The fifth lens E5 may have a positive refractive power, the object-side surface S9 of the fifth lens E5 may be a concave surface, and the image-side surface S10 of the fifth lens E5 may be a convex surface.

The sixth lens E6 may have a positive refractive power, the object-side surface S11 of the sixth lens E6 may be a convex surface, and the image-side surface S12 of the sixth lens E6 may be a concave surface.

The seventh lens E7 may have a negative refractive power, the object-side surface S13 of the seventh lens E7 may be a convex surface, and the image-side surface S14 of the seventh lens E7 may be a concave surface.

Table 7 below shows the effective focal lengths f1 to f7 of the first to seventh lenses E1 to E7, the total effective focal length f of the camera lens assembly, the total track length TTL of the camera lens assembly, and the half of the diagonal length ImgH of the effective pixel area of the electronic light sensing element.

TABLE 7

| f1(mm) | 9.92 | f(mm) | 3.82 |
|---|---|---|---|
| f2(mm) | 4.75 | TTL(mm) | 4.70 |
| f3(mm) | −10.87 | ImgH(mm) | 3.10 |
| f4(mm) | −141.12 | | |
| f5(mm) | 10.85 | | |
| f6(mm) | 26.31 | | |
| f7(mm) | −5.63 | | |

Table 8 shows the surface type, the radius of curvature, the thickness, the material and the conic coefficient of each lens of the camera lens assembly in the present embodiment. The units of the radius of curvature and the thickness are millimeters (mm).

TABLE 8

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3769 | | | |
| S1 | aspheric | 1.6393 | 0.4394 | 1.55 | 56.1 | −0.5357 |
| S2 | aspheric | 2.1276 | 0.0400 | | | −4.1273 |
| S3 | spherical | 2.5721 | 0.6005 | 1.55 | 56.1 | 0.0000 |
| S4 | aspheric | 250.8481 | 0.0300 | | | 63.0000 |
| S5 | aspheric | 4.4628 | 0.2400 | 1.67 | 20.4 | −32.6523 |
| S6 | aspheric | 2.7036 | 0.4075 | | | 3.6541 |
| S7 | aspheric | −32.9235 | 0.3428 | 1.67 | 20.4 | 63.0000 |
| S8 | aspheric | −50.8220 | 0.1094 | | | 51.2696 |
| S9 | aspheric | −5.8593 | 0.5039 | 1.55 | 56.1 | −63.7406 |
| S10 | aspheric | −3.0370 | 0.0334 | | | −6.0068 |
| S11 | aspheric | 4.0785 | 0.3240 | 1.55 | 56.1 | −79.9000 |
| S12 | aspheric | 5.5335 | 0.2858 | | | −5.6249 |
| S13 | aspheric | 1.5261 | 0.3359 | 1.54 | 55.7 | −9.2814 |
| S14 | aspheric | 0.9364 | 0.6707 | | | −5.4675 |
| S15 | spherical | infinite | 0.1100 | 1.52 | 64.2 | |
| S16 | spherical | infinite | 0.2266 | | | |
| S17 | spherical | infinite | | | | |

Table 9 below shows the high-order coefficients applicable to the aspheric surfaces S1-S14 of the aspheric lenses in the present embodiment. The surface type of each aspheric surface may be defined by the formula (1) given in the above Embodiment 1.

TABLE 9

| surface number | A4 | A6 | A8 | A10 | A12 | A14 | A16 | A18 |
|---|---|---|---|---|---|---|---|---|
| S1 | −8.5600E−03 | 7.2490E−03 | −3.9930E−02 | 3.7359E−02 | −2.0020E−02 | 3.1400E−05 | 2.0920E−03 | 0.0000E+00 |
| S2 | 2.2676E−02 | −3.8050E−02 | 3.5960E−03 | −1.5310E−02 | 9.9950E−03 | 0.0000E+00 | 0.0000E+00 | 0.0000E+00 |
| S4 | −8.0160E−02 | 2.6860E−01 | −4.1555E−01 | 3.1960E−01 | −1.5156E−01 | 4.7024E−02 | −7.2600E−03 | 0.0000E+00 |
| S5 | −1.0877E−01 | 2.7040E−01 | −4.1026E−01 | 2.8590E−01 | −8.0270E−02 | 1.7689E−02 | −4.4200E−03 | 0.0000E+00 |
| S6 | −9.9170E−02 | −2.6310E−02 | 4.1103E−01 | −1.1841E+00 | 1.6614E+00 | −1.1654E+00 | 3.4150E−01 | 0.0000E+00 |
| S7 | −8.3090E−02 | −1.7330E−02 | −6.0080E−02 | 3.5458E−02 | 0.0000E+00 | 0.0000E+00 | 0.0000E+00 | 0.0000E+00 |
| S8 | −1.0475E−01 | 1.0834E−01 | −1.1471E−01 | 4.2201E−02 | 0.0000E+00 | 0.0000E+00 | 0.0000E+00 | 0.0000E+00 |
| S9 | −1.6415E−01 | 3.3374E−01 | −2.7623E−01 | 1.1956E−01 | −2.3180E−02 | 0.0000E+00 | 0.0000E+00 | 0.0000E+00 |
| S10 | −2.8115E−01 | 5.6501E−01 | −7.7447E−01 | 7.2420E−01 | −4.0822E−01 | 1.3312E−01 | −2.3499E−02 | 1.7545E−03 |
| S11 | 1.1507E−01 | −1.1478E−01 | −7.3110E−02 | 1.3139E−01 | −7.5350E−02 | 2.0254E−02 | −2.1828E−03 | 2.6560E−05 |

TABLE 9-continued

| surface number | A4 | A6 | A8 | A10 | A12 | A14 | A16 | A18 |
|---|---|---|---|---|---|---|---|---|
| S12 | 1.3253E−01 | −1.3895E−01 | −6.4300E−03 | 6.4735E−02 | −4.2950E−02 | 1.3330E−02 | −2.0171E−03 | 1.1904E−04 |
| S13 | −4.3318E−01 | 3.8761E−01 | −2.5035E−01 | 1.0563E−01 | −2.6750E−02 | 3.8920E−03 | −2.9643E−04 | 8.9304E−06 |
| S14 | −2.3326E−01 | 1.6981E−01 | −9.4780E−02 | 3.3207E−02 | −6.4500E−03 | 5.8200E−04 | −7.9030E−06 | −1.3485E−06 |

Figure 12:
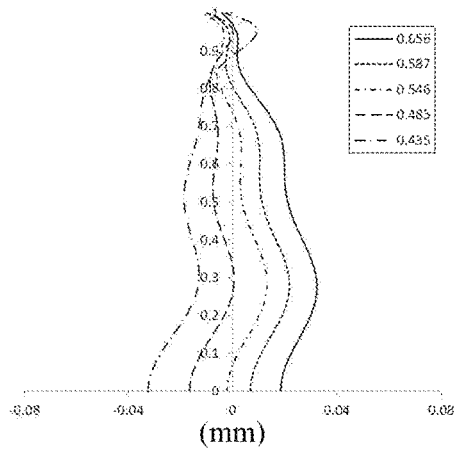
FIGS. 12-15 respectively illustrate a longitudinal aberration curve, an astigmatic curve, a distortion curve and a lateral color curve of the camera lens assembly according to Embodiment 3.
Figure 13:
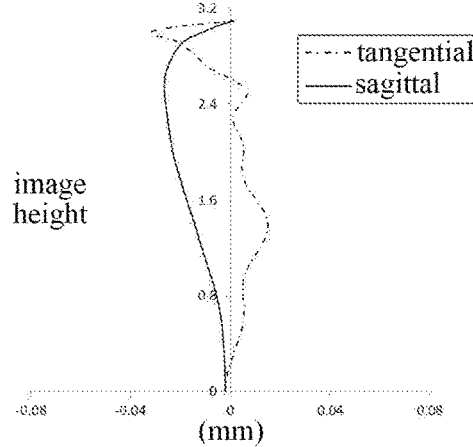
Figure 14:
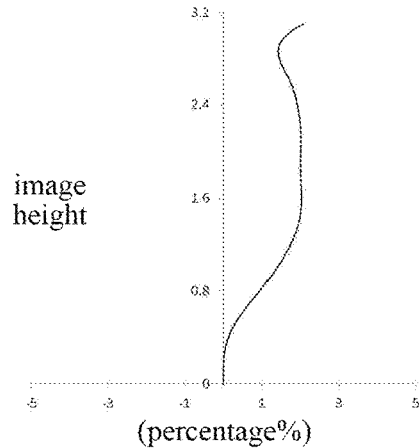
Figure 15:
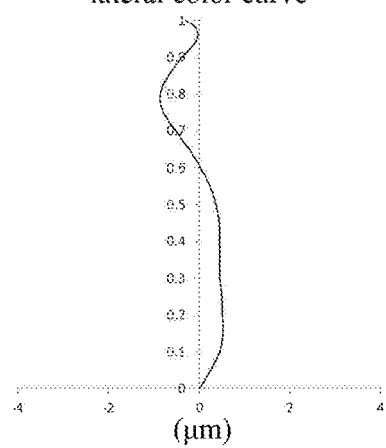

FIG. 12 shows the longitudinal aberration curve of the camera lens assembly according to Embodiment 3, representing deviations of focal points where lights of different wavelengths converge after passing through the optical system. FIG. 13 shows the astigmatic curve of the camera lens assembly according to Embodiment 3, representing a curvature of the tangential image plane and a curvature of the sagittal image plane. FIG. 14 shows the distortion curve of the camera lens assembly according to Embodiment 3, representing degrees of distortion at different viewing angles. FIG. 15 shows the lateral color curve of the camera lens assembly according to Embodiment 3, representing deviations of different heights of images formed on the image plane by light passing through the camera lens assembly. In summary, as can be seen with reference to FIGS. 12 to 15, the camera lens assembly according to Embodiment 3 is suitable for a portable electronic product and having a large aperture, good imaging quality, and low sensitivity.

Embodiment 4

A camera lens assembly according to Embodiment 4 of the present disclosure is described with reference to FIGS. 16 to 20.

Figure 16:
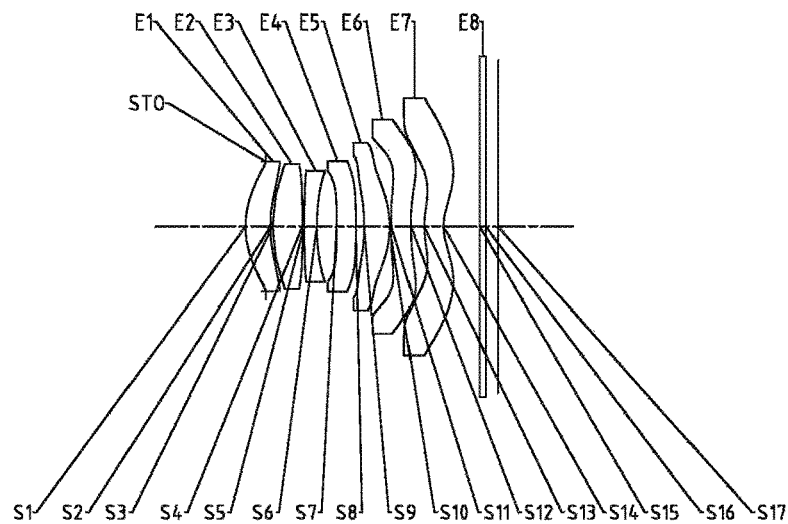
FIG. 16 is a schematic structural diagram illustrating a camera lens assembly according to Embodiment 4.

FIG. 16 is a schematic structural diagram illustrating the camera lens assembly according to Embodiment 4. The camera lens assembly includes, sequentially from an object side to an image side, a first lens E1, a second lens E2, a third lens E3, a fourth lens E4, a fifth lens E5, a sixth lens E6, and a seventh lens E7.

The first lens E1 may have a positive refractive power, the object-side surface S1 of the first lens E1 may be a convex surface, and the image-side surface S2 of the first lens E1 is a concave surface.

The second lens E2 may have a positive refractive power, the object-side surface S3 of the second lens E2 may be a convex surface, and the image-side surface S4 of the second lens E2 may be a convex surface.

The third lens E3 may have a negative refractive power, the object-side surface S5 of the third lens E3 may be a convex surface, and the image-side surface S6 of the third lens E3 may be a concave surface.

The fourth lens E4 may have no refractive power, the object-side surface S7 of the fourth lens E4 may be a flat surface, and the image-side surface S8 of the fourth lens E4 may be a flat surface.

The fifth lens E5 may have a positive refractive power, the object-side surface S9 of the fifth lens E5 may be a concave surface, and the image-side surface S10 of the fifth lens E5 may be a convex surface.

The sixth lens E6 may have a negative refractive power, the object-side surface S11 of the sixth lens E6 may be a concave surface, and the image-side surface S12 of the sixth lens E6 may be a concave surface.

The seventh lens E7 may have a negative refractive power, the object-side surface S13 of the seventh lens E7 may be a convex surface, and the image-side surface S14 of the seventh lens E7 may be a concave surface.

Table 10 below shows the effective focal lengths f1 to f7 of the first to seventh lenses E1 to E7, the total effective focal length f of the camera lens assembly, the total track length TTL of the camera lens assembly, and the half ImgH of the diagonal length of the effective pixel area of the electronic light sensing element.

TABLE 10

| f1(mm) | 7.33 | f(mm) | 3.78 |
|---|---|---|---|
| f2(mm) | 5.60 | TTL(mm) | 4.70 |
| f3(mm) | −10.53 | ImgH(mm) | 3.05 |
| f4(mm) | — | | |
| f5(mm) | 5.15 | | |
| f6(mm) | −10.73 | | |
| f7(mm) | −6.59 | | |

Table 11 shows the surface type, the radius of curvature, the thickness, the material and the conic coefficient of each lens of the camera lens assembly in the present embodiment. The units of the radius of curvature and the thickness are millimeters (mm).

TABLE 11

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.3770 | | | |
| S1 | aspheric | 1.6971 | 0.4658 | 1.55 | 56.1 | −0.5159 |
| S2 | aspheric | 2.6599 | 0.0400 | | | −4.8545 |
| S3 | spherical | 3.0640 | 0.5554 | 1.55 | 56.1 | 0.0000 |
| S4 | aspheric | −10000.0000 | 0.0300 | | | −79.9000 |
| S5 | aspheric | 6.2505 | 0.2400 | 1.67 | 20.4 | −47.9892 |
| S6 | aspheric | 3.2577 | 0.3676 | | | 4.6588 |
| S7 | aspheric | infinite | 0.3644 | 1.67 | 20.4 | 63.0000 |
| S8 | aspheric | infinite | 0.1509 | | | 63.0000 |
| S9 | aspheric | −5.5577 | 0.4767 | 1.55 | 56.1 | −8.8997 |
| S10 | aspheric | −1.9245 | 0.0300 | | | −10.8167 |

TABLE 11-continued

| surface number | surface type | radius of curvature | thickness | material refractive index | abbe number | conic coefficient |
|---|---|---|---|---|---|---|
| S11 | aspheric | −4000.0000 | 0.3578 | 1.67 | 20.4 | −79.9000 |
| S12 | aspheric | 7.1774 | 0.2455 | | | −2.5757 |
| S13 | aspheric | 1.3825 | 0.3626 | 1.54 | 55.7 | −7.5141 |
| S14 | aspheric | 0.9033 | 0.6768 | | | −4.8825 |
| S15 | spherical | infinite | 0.1100 | 1.52 | 64.2 | |
| S16 | spherical | infinite | 0.2266 | | | |
| S17 | spherical | infinite | | | | |

Table 12 below shows the high-order coefficients applicable to the aspheric surfaces S1-S14 of the aspheric lenses in the present embodiment. The surface type of each aspheric surface may be defined by the formula (1) given in the above Embodiment 1.

TABLE 12

| surface number | A4 | A6 | A8 | A10 | A12 | A14 | A16 | A18 |
|---|---|---|---|---|---|---|---|---|
| S1 | −9.4900E−03 | 2.0266E−02 | −7.9972E−02 | 1.0631E−01 | −8.7070E−02 | 3.3585E−02 | −4.4300E−03 | 0.0000E+00 |
| S2 | 6.9190E−03 | −2.3220E−02 | −6.2349E−03 | −5.5900E−03 | 8.0840E−03 | 0.0000E+00 | 0.0000E+00 | 0.0000E+00 |
| S4 | −1.4361E−01 | 4.0880E−01 | −5.4079E−01 | 2.6064E−01 | 3.3296E−02 | −7.1550E−02 | 1.7835E−02 | 0.0000E+00 |
| S5 | −1.8047E−01 | 4.7305E−01 | −6.4394E−01 | 4.2224E−01 | −1.0734E−01 | 1.7410E−02 | −5.9500E−03 | 0.0000E+00 |
| S6 | −1.0350E−01 | 7.7987E−02 | 1.6172E−01 | −6.7627E−01 | 9.8486E−01 | −6.7683E−01 | 1.9565E−01 | 0.0000E+00 |
| S7 | −1.1986E−01 | 7.7527E−02 | −1.7534E−01 | 7.4921E−02 | 0.0000E+00 | 0.0000E+00 | 0.0000E+00 | 0.0000E+00 |
| S8 | −2.1594E−01 | 3.7424E−01 | −3.6863E−01 | 1.2204E−01 | 0.0000E+00 | 0.0000E+00 | 0.0000E+00 | 0.0000E+00 |
| S9 | −3.7874E−01 | 9.0234E−01 | −8.7538E−01 | 4.0822E−01 | −7.7510E−02 | 0.0000E+00 | 0.0000E+00 | 0.0000E+00 |
| S10 | −2.6863E−01 | 5.7037E−01 | −8.2832E−01 | 8.0948E−01 | −4.7993E−01 | 1.6719E−01 | −3.2204E−02 | 2.6860E−03 |
| S11 | 2.8741E−01 | −4.7284E−01 | 3.8312E−01 | −2.5030E−01 | 1.2662E−01 | −4.4510E−02 | 9.3618E−03 | −8.5000E−04 |
| S12 | 1.6330E−01 | −2.4248E−01 | 1.3829E−01 | −4.8190E−02 | 9.1780E−03 | −4.6000E−04 | −1.0841E−04 | 1.2500E−05 |
| S13 | −4.3064E−01 | 3.4273E−01 | −2.1330E−01 | 9.6672E−02 | −2.7720E−02 | 4.7190E−03 | −4.3665E−04 | 1.6900E−05 |
| S14 | −2.5496E−01 | 1.9092E−01 | −1.1492E−01 | 4.6577E−02 | −1.1560E−02 | 1.6630E−03 | −1.2602E−04 | 3.8400E−06 |

Figure 17:
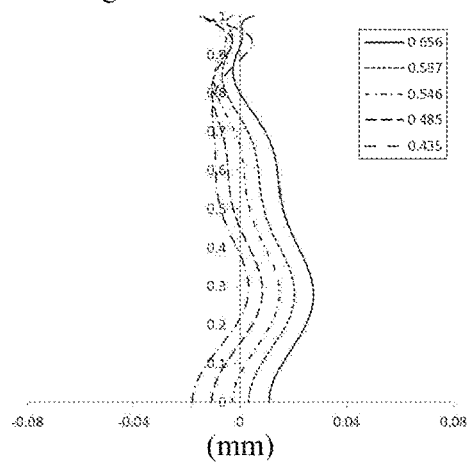
FIGS. 17-20 respectively illustrate a longitudinal aberration curve, an astigmatic curve, a distortion curve and a lateral color curve of the camera lens assembly according to Embodiment 4.
Figure 18:
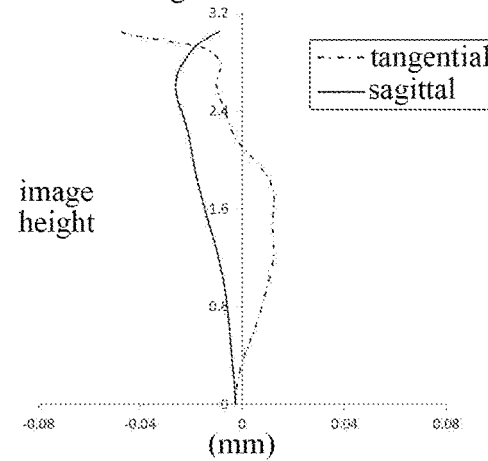
Figure 19:
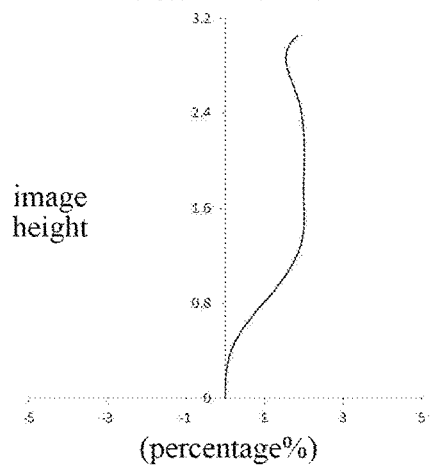
Figure 20:
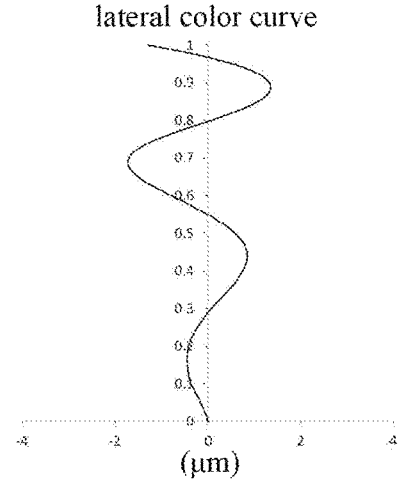

FIG. 17 shows the longitudinal aberration curve of the camera lens assembly according to Embodiment 4, representing deviations of focal points where lights of different wavelengths converge after passing through the optical system. FIG. 18 shows the astigmatic curve of the camera lens assembly according to Embodiment 4, representing a curvature of the tangential image plane and a curvature of the sagittal image plane. FIG. 19 shows the distortion curve of the camera lens assembly according to Embodiment 4, representing degrees of distortion at different viewing angles. FIG. 20 shows the lateral color curve of the camera lens assembly according to Embodiment 4, representing deviations of different heights of images formed on the image plane by light passing through the camera lens assembly. In summary, as can be seen with reference to FIGS. 17 to 20, the camera lens assembly according to Embodiment 4 is suitable for a portable electronic product and having a large aperture, good imaging quality, and low sensitivity.

Embodiment 5

A camera lens assembly according to Embodiment 5 of the present disclosure is described with reference to FIGS. 21 to 25.

Figure 21:
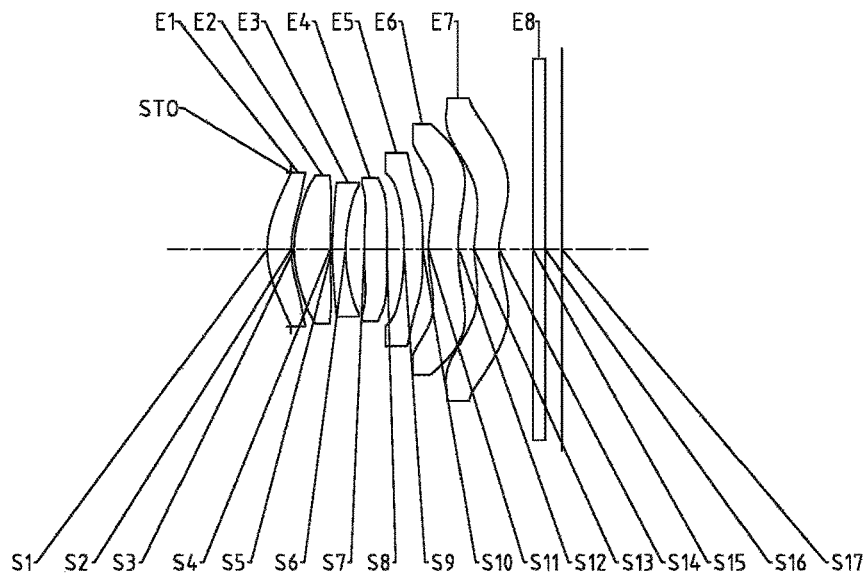
FIG. 21 is a schematic structural diagram illustrating a camera lens assembly according to Embodiment 5.

FIG. 21 is a schematic structural diagram illustrating the camera lens assembly according to Embodiment 5. The camera lens assembly includes, sequentially from an object side to an image side, a first lens E1, a second lens E2, a third lens E3, a fourth lens E4, a fifth lens E5, a sixth lens E6, and a seventh lens E7.

The first lens E1 may have a positive refractive power, the object-side surface S1 of the first lens E1 may be a convex surface, and the image-side surface S2 of the first lens E1 is a concave surface.

The second lens E2 may have a positive refractive power, the object-side surface S3 of the second lens E2 may be a convex surface, and the image-side surface S4 of the second lens E2 may be a concave surface.

The third lens E3 may have a negative refractive power, the object-side surface S5 of the third lens E3 may be a convex surface, and the image-side surface S6 of the third lens E3 may be a concave surface.

The fourth lens E4 may have a positive refractive power, the object-side surface S7 of the fourth lens E4 may be a convex surface, and the image-side surface S8 of the fourth lens E4 may be a concave surface.

The fifth lens E5 may have a negative refractive power, the object-side surface S9 of the fifth lens E5 may be a concave surface, and the image-side surface S10 of the fifth lens E5 may be a convex surface.

The sixth lens E6 may have a positive refractive power, the object-side surface S11 of the sixth lens E6 may be a convex surface, and the image-side surface S12 of the sixth lens E6 may be a concave surface.

The seventh lens E7 may have a negative refractive power, the object-side surface S13 of the seventh lens E7 may be a convex surface, and the image-side surface S14 of the seventh lens E7 may be a concave surface.

Table 13 below shows the effective focal lengths f1 to f7 of the first to seventh lenses E1 to E7, the total effective focal length f of the camera lens assembly, the total track length TTL of the camera lens assembly, and the half of the diagonal length ImgH of the effective pixel area of the electronic light sensing element.

TABLE 13

| | | | |
|---|---|---|---|
| f1(mm) | 19.28 | f(mm) | 4.10 |
| f2(mm) | 4.58 | TTL(mm) | 4.98 |
| f3(mm) | -12.12 | ImgH(mm) | 3.40 |
| f4(mm) | 16.62 | | |
| f5(mm) | -13.07 | | |

TABLE 13-continued

| | |
|---|---|
| f6(mm) | 11.23 |
| f7(mm) | -10.33 |

Table 14 shows the surface type, the radius of curvature, the thickness, the material and the conic coefficient of each lens of the camera lens assembly in the present embodiment. The units of the radius of curvature and the thickness are millimeters (mm).

TABLE 14

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | -0.3956 | | | |
| S1 | aspheric | 1.7583 | 0.4062 | 1.55 | 56.1 | -0.9063 |
| S2 | aspheric | 1.9382 | 0.0482 | | | -5.8983 |
| S3 | aspheric | 2.0346 | 0.6116 | 1.55 | 56.1 | -0.9075 |
| S4 | aspheric | 9.7410 | 0.0300 | | | 10.5890 |
| S5 | aspheric | 3.7321 | 0.2300 | 1.67 | 20.4 | -37.7093 |
| S6 | aspheric | 2.4912 | 0.3187 | | | 3.0702 |
| S7 | aspheric | 8.7400 | 0.3797 | 1.55 | 56.1 | 50.9435 |
| S8 | aspheric | 229.3880 | 0.2889 | | | -89.9000 |
| S9 | aspheric | -6.1217 | 0.3200 | 1.65 | 23.5 | 18.3089 |
| S10 | aspheric | -22.8238 | 0.0974 | | | 66.0000 |
| S11 | aspheric | 2.8853 | 0.5035 | 1.65 | 23.5 | 0.0000 |
| S12 | aspheric | 4.4680 | 0.2582 | | | -81.9261 |
| S13 | aspheric | 1.8081 | 0.4201 | 1.54 | 55.7 | -0.8489 |
| S14 | aspheric | 1.2531 | 0.5747 | | | -4.9989 |
| S15 | spherical | infinite | 0.2100 | 1.52 | 64.2 | |
| S16 | spherical | infinite | 0.2833 | | | |
| S17 | spherical | infinite | | | | |

Table 15 below shows the high-order coefficients applicable to the aspheric surfaces S1-S14 of the aspheric lenses in the present embodiment. The surface type of each aspheric surface may be defined by the formula (1) given in the above Embodiment 1.

TABLE 15

| surface number | A4 | A6 | A8 | A10 | A12 |
|---|---|---|---|---|---|
| S1 | -5.1186E-03 | 3.8997E-02 | -2.1132E-01 | 4.5311E-01 | -5.8080E-01 |
| S2 | 1.0251E-01 | -2.2170E-01 | 6.5141E-02 | -3.7751E-02 | 1.7973E-01 |
| S3 | 5.2264E-02 | -1.6775E-01 | 1.5465E-01 | -3.4202E-01 | 5.5469E-01 |
| S4 | -1.4673E-01 | 4.6436E-01 | -1.1322E+00 | 1.7628E+00 | -1.7204E+00 |
| S5 | -1.3338E-01 | 3.7362E-01 | -8.5121E-01 | 1.2823E+00 | -1.0749E+00 |
| S6 | -1.1834E-01 | 7.0651E-02 | 7.3923E-02 | -4.3231E-01 | 8.7116E-01 |
| S7 | -5.1018E-02 | 6.6190E-03 | -5.5220E-02 | -7.2697E-02 | 3.2639E-01 |
| S8 | -4.4824E-02 | 4.1303E-01 | -1.5381E-01 | 2.0539E-01 | -2.2245E-01 |
| S9 | -4.4289E-02 | 5.0291E-02 | -1.7690E-02 | -5.7446E-03 | -1.5976E-01 |
| S10 | -7.4699E-02 | -3.1495E-01 | 9.2849E-01 | -1.3534E+00 | 1.2046E+00 |
| S11 | 2.4990E-02 | -3.9944E-01 | 6.6294E-01 | -7.4544E-01 | 5.5281E-01 |
| S12 | 1.4450E-01 | -2.1316E-01 | 1.4500E-01 | -6.9729E-02 | 2.4383E-02 |
| S13 | -4.2453E-01 | 2.6899E-01 | -1.3181E-01 | 4.4790E-02 | -9.7500E-03 |
| S14 | -1.9162E-01 | 1.1245E-01 | -5.5410E-02 | 1.8528E-02 | -4.0400E-03 |

| surface number | A14 | A16 | A18 | A20 |
|---|---|---|---|---|
| S1 | 4.4122E-01 | -1.9476E-01 | 4.6470E-02 | -4.6800E-03 |
| S2 | -1.4249E-01 | 1.0890E-02 | 2.3392E-02 | -6.5400E-03 |
| S3 | -3.1210E-01 | -2.3090E-02 | 7.7881E-02 | -1.9970E-02 |
| S4 | 1.0147E+00 | -3.2822E-01 | 4.2529E-02 | 8.2700E-04 |
| S5 | 3.2374E-01 | 1.7703E-01 | -1.6476E-01 | 3.6520E-02 |
| S6 | -1.0292E+00 | 7.3104E-01 | -2.8969E-01 | 5.1496E-02 |
| S7 | -4.4771E-01 | 2.7030E-01 | -6.0520E-02 | 0.0000E+00 |
| S8 | 1.7195E-01 | -7.9690E-02 | 1.7129E-02 | 0.0000E+00 |
| S9 | 3.6084E-01 | -3.2587E-01 | 1.3976E-01 | -2.3880E-02 |

TABLE 15-continued

| | | | | |
|---|---|---|---|---|
| S10 | −6.5869E−01 | 2.1513E−01 | −3.8550E−02 | 2.9200E−03 |
| S11 | −2.6024E−01 | 7.4416E−02 | −1.1740E−02 | 7.8000E−04 |
| S12 | −6.0600E−03 | 9.9400E−04 | −9.3000E−05 | 3.7200E−06 |
| S13 | 1.3380E−03 | −1.1000E−04 | 5.9100E−06 | −1.5000E−07 |
| S14 | 6.1600E−04 | −7.0000E−05 | 5.4700E−06 | −2.0000E−07 |

Figure 22:
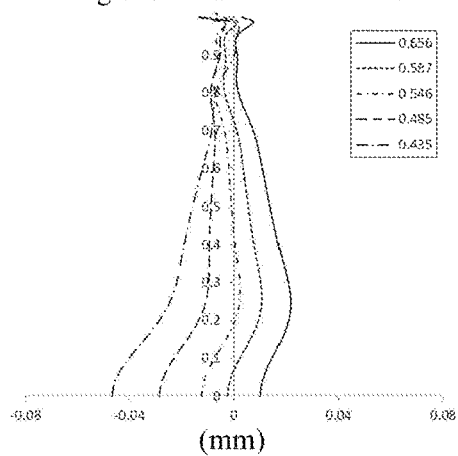
FIGS. 22-25 respectively illustrate a longitudinal aberration curve, an astigmatic curve, a distortion curve and a lateral color curve of the camera lens assembly according to Embodiment 5.
Figure 23:
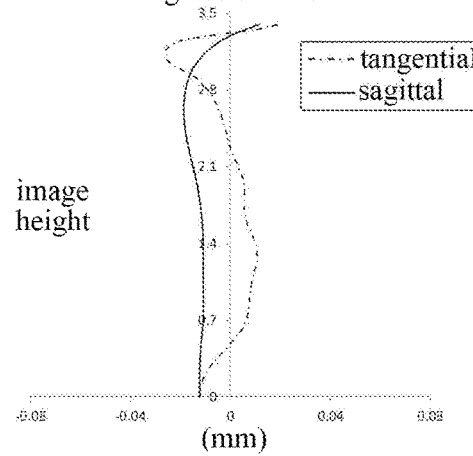
Figure 24:
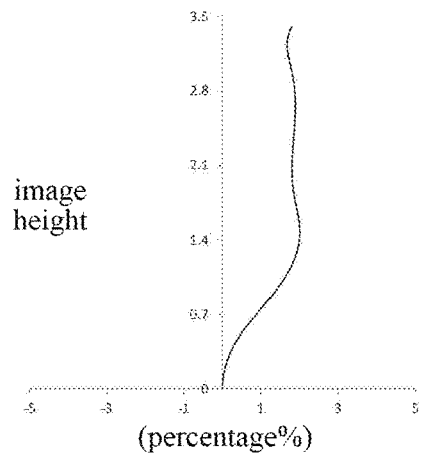
Figure 25:
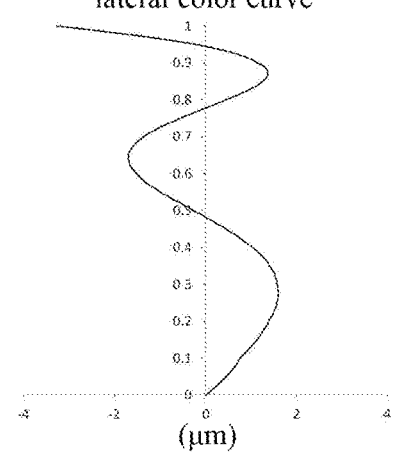

FIG. 22 shows the longitudinal aberration curve of the camera lens assembly according to Embodiment 5, representing deviations of focal points where lights of different wavelengths converge after passing through the optical system. FIG. 23 shows the astigmatic curve of the camera lens assembly according to Embodiment 5, representing a curvature of the tangential image plane and a curvature of the sagittal image plane. FIG. 24 shows the distortion curve of the camera lens assembly according to Embodiment 5, representing degrees of distortion at different viewing angles. FIG. 25 shows the lateral color curve of the camera lens assembly according to Embodiment 5, representing deviations of different heights of images formed on the image plane by light passing through the camera lens assembly. In summary, as can be seen with reference to FIGS. 22 to 25, the camera lens assembly according to Embodiment 5 is suitable for a portable electronic product and having a large aperture, good imaging quality, and low sensitivity.

Embodiment 6

A camera lens assembly according to Embodiment 6 of the present disclosure is described with reference to FIGS. 26 to 30.

Figure 26:
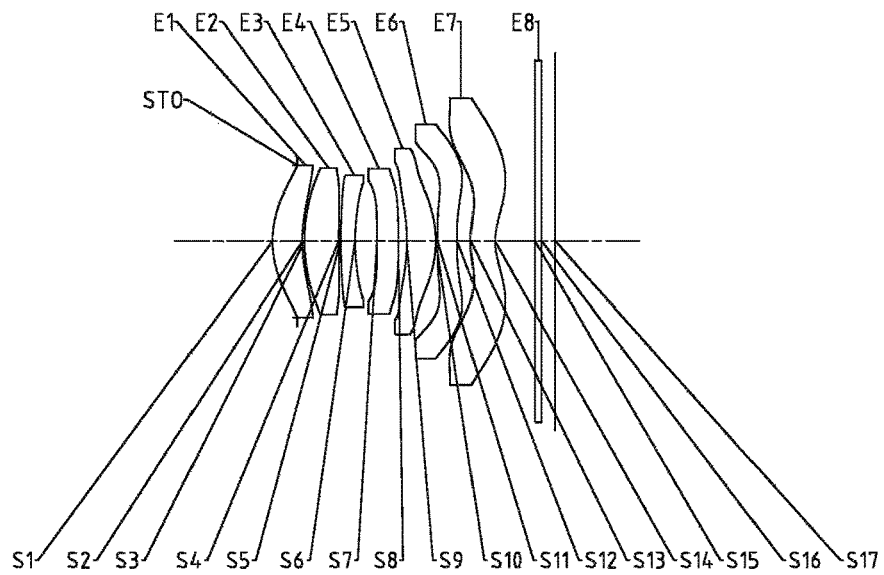
FIG. 26 is a schematic structural diagram illustrating a camera lens assembly according to Embodiment 6.

FIG. 26 is a schematic structural diagram illustrating the camera lens assembly according to Embodiment 6. The camera lens assembly includes, sequentially from an object side to an image side, a first lens E1, a second lens E2, a third lens E3, a fourth lens E4, a fifth lens E5, a sixth lens E6, and a seventh lens E7.

The first lens E1 may have a positive refractive power, the object-side surface S1 of the first lens E1 may be a convex surface, and the image-side surface S2 of the first lens E1 may be a concave surface.

The second lens E2 may have a positive refractive power, the object-side surface S3 of the second lens E2 may be a convex surface, and the image-side surface S4 of the second lens E2 may be a concave surface.

The third lens E3 may have a negative refractive power, the object-side surface S5 of the third lens E3 may be a convex surface, and the image-side surface S6 of the third lens E3 may be a concave surface.

The fourth lens E4 may have a positive refractive power, the object-side surface S7 of the fourth lens E4 may be a concave surface, and the image-side surface S8 of the fourth lens E4 may be a convex surface.

The fifth lens E5 may have a positive refractive power, the object-side surface S9 of the fifth lens E5 may be a concave surface, and the image-side surface S10 of the fifth lens E5 may be a convex surface.

The sixth lens E6 may have a negative refractive power, the object-side surface S11 of the sixth lens E6 may be a concave surface, and the image-side surface S12 of the sixth lens E6 may be a concave surface.

The seventh lens E7 may have a negative refractive power, the object-side surface S13 of the seventh lens E7 may be a convex surface, and the image-side surface S14 of the seventh lens E7 may be a concave surface.

Table 16 below shows the effective focal lengths f1 to f7 of the first to seventh lenses E1 to E7, the total effective focal length f of the camera lens assembly, the total track length TTL of the camera lens assembly, and the half ImgH of the diagonal length of the effective pixel area of the electronic light sensing element.

TABLE 16

| | | | |
|---|---|---|---|
| f1(mm) | 7.21 | f(mm) | 3.78 |
| f2(mm) | 6.66 | TTL(mm) | 4.70 |
| f3(mm) | −15.88 | ImgH(mm) | 3.10 |
| f4(mm) | 5991.62 | | |
| f5(mm) | 5.59 | | |
| f6(mm) | −11.01 | | |
| f7(mm) | −7.41 | | |

Table 17 shows the surface type, the radius of curvature, the thickness, the material and the conic coefficient of each lens of the camera lens assembly in the present embodiment. The units of the radius of curvature and the thickness are millimeters (mm).

TABLE 17

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.4100 | | | |
| S1 | aspheric | 1.7100 | 0.4971 | 1.55 | 56.1 | −0.4907 |
| S2 | aspheric | 2.7104 | 0.0350 | | | −5.4705 |
| S3 | spherical | 2.8704 | 0.5719 | 1.55 | 56.1 | 0.0000 |
| S4 | aspheric | 12.6361 | 0.0300 | | | 23.5122 |
| S5 | aspheric | 4.7122 | 0.2400 | 1.67 | 20.4 | −44.7153 |
| S6 | aspheric | 3.1958 | 0.3662 | | | 4.9182 |
| S7 | aspheric | −4000.0000 | 0.3549 | 1.67 | 20.4 | 63.0000 |
| S8 | aspheric | −2000.0000 | 0.1397 | | | −79.9000 |
| S9 | aspheric | −5.2888 | 0.4841 | 1.55 | 56.1 | −8.9773 |
| S10 | aspheric | −1.9981 | 0.0300 | | | −10.5305 |

TABLE 17-continued

| surface number | surface type | radius of curvature | thickness | material refractive index | abbe number | conic coefficient |
|---|---|---|---|---|---|---|
| S11 | aspheric | −373.9510 | 0.3240 | 1.67 | 20.4 | −79.9000 |
| S12 | aspheric | 7.4985 | 0.2197 | | | −3.6886 |
| S13 | aspheric | 1.5278 | 0.4058 | 1.54 | 55.7 | −6.0739 |
| S14 | aspheric | 1.0018 | 0.6648 | | | −4.8546 |
| S15 | spherical | infinite | 0.1100 | 1.52 | 64.2 | |
| S16 | spherical | infinite | 0.2266 | | | |
| S17 | spherical | infinite | | | | |

Table 18 below shows the high-order coefficients applicable to the aspheric surfaces S1-S14 of the aspheric lenses in the present embodiment. The surface type of each aspheric surface may be defined by the formula (1) given in the above Embodiment 1.

TABLE 18

| surface number | A4 | A6 | A8 | A10 | A12 | A1 | A16 | A18 |
|---|---|---|---|---|---|---|---|---|
| S1 | −1.2990E−02 | 4.2052E−02 | −1.3844E−01 | 1.9172E−01 | −1.5220E−01 | 5.9830E−02 | −8.9500E−03 | 0.0000E+00 |
| S2 | 7.8340E−03 | −3.2120E−02 | 2.6350E−03 | −5.2900E−03 | 5.5160E−03 | 0.0000E+00 | 0.0000E+00 | 0.0000E+00 |
| S4 | −1.6480E−01 | 3.9630E−01 | −4.2233E−01 | 4.2800E−02 | 2.1215E−01 | −1.3825E−01 | 2.6585E−02 | 0.0000E+00 |
| S5 | −1.6481E−01 | 3.9671E−01 | −4.4892E−01 | 1.4036E−02 | 1.2238E−01 | −8.0860E−02 | 1.0881E−02 | 0.0000E+00 |
| S6 | −9.7010E−02 | 6.2425E−02 | 1.4916E−01 | −5.8114E−01 | 8.4397E−01 | −5.7975E−01 | 1.7011E−01 | 0.0000E+00 |
| S7 | −1.0650E−01 | 4.3105E−02 | −1.4729E−01 | 7.3428E−02 | 0.0000E+00 | 0.0000E+00 | 0.0000E+00 | 0.0000E+00 |
| S8 | −1.9024E−01 | 3.2041E−01 | −3.2087E−01 | 1.0872E−01 | 0.0000E+00 | 0.0000E+00 | 0.0000E+00 | 0.0000E+00 |
| S9 | −3.5051E−01 | 8.3246E−01 | −8.1280E−01 | 3.8527E−01 | −7.5130E−02 | 0.0000E+00 | 0.0000E+00 | 0.0000E+00 |
| S10 | −2.9298E−01 | 6.3334E−01 | −9.4361E−01 | 9.1187E−01 | −5.2105E−01 | 1.7119E−01 | −3.0390E−02 | 2.2860E−03 |
| S11 | 2.7014E−01 | −4.1578E−01 | 2.7667E−01 | −1.4670E−01 | 6.7038E−02 | −2.3900E−02 | 5.4350E−03 | −5.4000E−04 |
| S12 | 1.7155E−01 | −2.5852E−01 | 1.4886E−01 | −5.4020E−02 | 1.1521E−02 | −9.3000E−04 | −7.9000E−05 | 1.3700E−05 |
| S13 | −4.5571E−01 | 3.7834E−01 | −2.4236E−01 | 1.1122E−01 | −3.2070E−02 | 5.4690E−03 | −5.0000E−04 | 1.9400E−05 |
| S14 | −2.5534E−01 | 2.0031E−01 | −1.2860E−01 | 5.5718E−02 | −1.4860E−02 | 2.3170E−03 | −1.9000E−04 | 6.5500E−06 |

Figure 27:
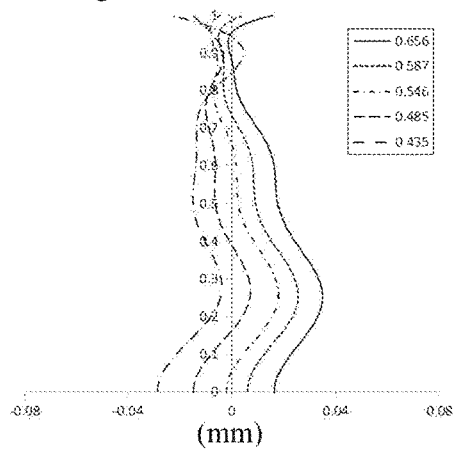
FIGS. 27-30 respectively illustrate a longitudinal aberration curve, an astigmatic curve, a distortion curve and a lateral color curve of the camera lens assembly according to Embodiment 6.
Figure 28:
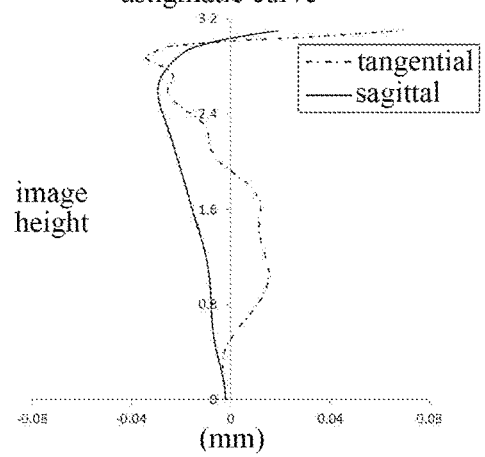
Figure 29:
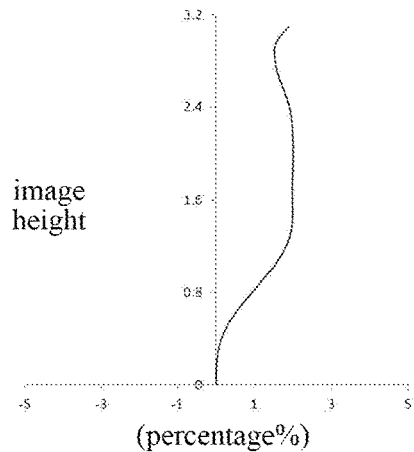
Figure 30:
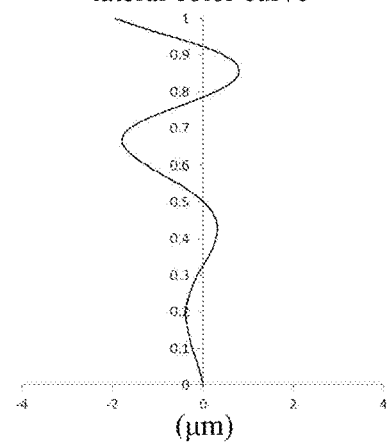

FIG. 27 shows the longitudinal aberration curve of the camera lens assembly according to Embodiment 6, representing deviations of focal points where lights of different wavelengths converge after passing through the optical system. FIG. 28 shows the astigmatic curve of the camera lens assembly according to Embodiment 6, representing a curvature of the tangential image plane and a curvature of the sagittal image plane. FIG. 29 shows the distortion curve of the camera lens assembly according to Embodiment 6, representing degrees of distortion at different viewing angles. FIG. 30 shows the lateral color curve of the camera lens assembly according to Embodiment 6, representing deviations of different heights of images formed on the image plane by light passing through the camera lens assembly. In summary, as can be seen with reference to FIGS. 27 to 30, the camera lens assembly according to Embodiment 6 is suitable for a portable electronic product and having a large aperture, good imaging quality, and low sensitivity.

Embodiment 7

A camera lens assembly according to Embodiment 7 of the present disclosure is described with reference to FIGS. 31 to 35.

Figure 31:
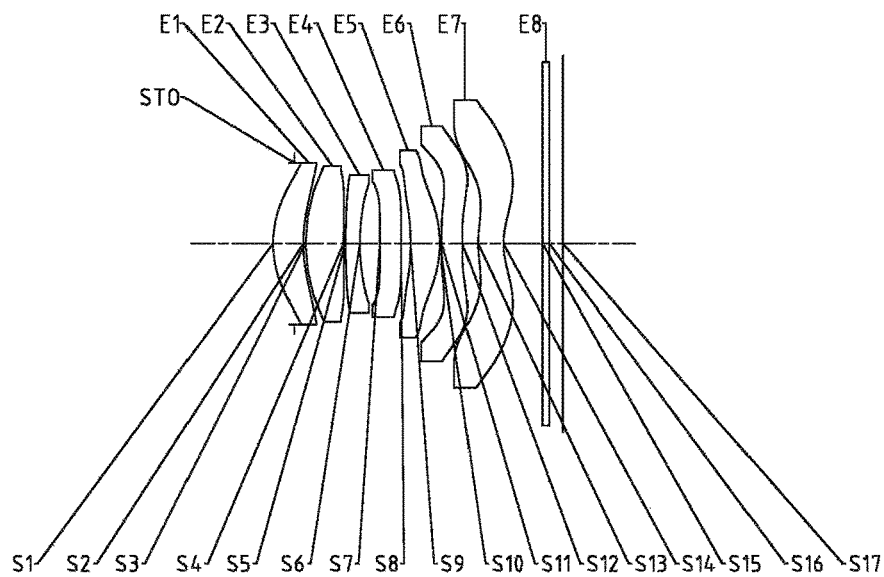
FIG. 31 is a schematic structural diagram illustrating a camera lens assembly according to Embodiment 7.

FIG. 31 is a schematic structural diagram illustrating the camera lens assembly according to Embodiment 7. The camera lens assembly includes, sequentially from an object side to an image side, a first lens E1, a second lens E2, a third lens E3, a fourth lens E4, a fifth lens E5, a sixth lens E6, and a seventh lens E7.

The first lens E1 may have a positive refractive power, the object-side surface S1 of the first lens E1 may be a convex surface, and the image-side surface S2 of the first lens E1 is a concave surface.

The second lens E2 may have a positive refractive power, the object-side surface S3 of the second lens E2 may be a convex surface, and the image-side surface S4 of the second lens E2 may be a concave surface.

The third lens E3 may have a negative refractive power, the object-side surface S5 of the third lens E3 may be a convex surface, and the image-side surface S6 of the third lens E3 may be a concave surface.

The fourth lens E4 may have a negative refractive power, the object-side surface S7 of the fourth lens E4 may be a convex surface, and the image-side surface S8 of the fourth lens E4 may be a concave surface.

The fifth lens E5 may have a positive refractive power, the object-side surface S9 of the fifth lens E5 may be a concave surface, and the image-side surface S10 of the fifth lens E5 may be a convex surface.

The sixth lens E6 may have a negative refractive power, the object-side surface S11 of the sixth lens E6 may be a convex surface, and the image-side surface S12 of the sixth lens E6 may be a concave surface.

The seventh lens E7 may have a negative refractive power, the object-side surface S13 of the seventh lens E7 may be a convex surface, and the image-side surface S14 of the seventh lens E7 may be a concave surface.

Table 19 below shows the effective focal lengths f1 to f7 of the first to seventh lenses E1 to E7, the total effective focal length f of the camera lens assembly, the total track length TTL of the camera lens assembly, and the half ImgH of the diagonal length of the effective pixel area of the electronic light sensing element.

TABLE 19

| | | | |
|---|---|---|---|
| f1(mm) | 7.51 | f(mm) | 3.87 |
| f2(mm) | 6.47 | TTL(mm) | 4.80 |
| f3(mm) | −12.86 | ImgH(mm) | 3.10 |
| f4(mm) | −265.54 | | |
| f5(mm) | 5.37 | | |
| f6(mm) | −14.42 | | |
| f7(mm) | −6.38 | | |

Table 20 shows the surface type, the radius of curvature, the thickness, the material and the conic coefficient of each lens of the camera lens assembly in the present embodiment. The units of the radius of curvature and the thickness are millimeters (mm).

TABLE 20

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.3515 | | | |
| S1 | aspheric | 1.7382 | 0.5039 | 1.55 | 56.1 | −0.4046 |
| S2 | aspheric | 2.7075 | 0.0350 | | | −4.0314 |
| S3 | spherical | 2.8431 | 0.6314 | 1.55 | 56.1 | 0.0000 |
| S4 | aspheric | 13.3643 | 0.0300 | | | 32.6990 |
| S5 | aspheric | 4.9462 | 0.2400 | 1.67 | 20.4 | −43.0685 |
| S6 | aspheric | 3.0776 | 0.3324 | | | 4.3907 |
| S7 | aspheric | 17.1535 | 0.3505 | 1.67 | 20.4 | 63.0000 |
| S8 | aspheric | 15.5121 | 0.1588 | | | −79.9000 |
| S9 | aspheric | −5.9067 | 0.4866 | 1.55 | 56.1 | −10.4578 |
| S10 | aspheric | −2.0170 | 0.0300 | | | −11.0846 |
| S11 | aspheric | 62.8030 | 0.3418 | 1.67 | 20.4 | −79.9000 |
| S12 | aspheric | 8.3305 | 0.2539 | | | 0.5795 |
| S13 | aspheric | 1.8672 | 0.4192 | 1.54 | 55.7 | −6.2968 |
| S14 | aspheric | 1.1138 | 0.6501 | | | −5.0736 |
| S15 | spherical | infinite | 0.1100 | 1.52 | 64.2 | |
| S16 | spherical | infinite | 0.2266 | | | |
| S17 | spherical | infinite | | | | |

Table 21 below shows the high-order coefficients applicable to the aspheric surfaces S1-S14 of the aspheric lenses in the present embodiment. The surface type of each aspheric surface may be defined by the formula (1) given in the above Embodiment 1.

TABLE 21

| surface number | A4 | A6 | A8 | A10 | A12 | A1 | A16 | A18 |
|---|---|---|---|---|---|---|---|---|
| S1 | −8.8300E−03 | 2.6736E−02 | −8.8770E−02 | 1.1853E−01 | −9.0240E−02 | 3.3335E−02 | −4.6300E−03 | 0.0000E+00 |
| S2 | 6.6410E−03 | −2.1290E−02 | 2.2020E−03 | −7.4700E−03 | 4.9910E−03 | 0.0000E+00 | 0.0000E+00 | 0.0000E+00 |
| S4 | −1.5924E−01 | 3.8966E−01 | −4.4905E−01 | 1.4853E−01 | 8.0575E−02 | −6.9260E−02 | 1.3509E−02 | 0.0000E+00 |
| S5 | −1.5883E−01 | 3.8028E−01 | −4.0222E−01 | 8.5072E−02 | 1.3888E−01 | −8.2510E−02 | 1.2041E−02 | 0.0000E+00 |
| S6 | −1.0303E−01 | 1.3313E−01 | −1.5454E−01 | 1.3776E−01 | −1.2410E−01 | 9.0270E−02 | −1.9770E−02 | 0.0000E+00 |
| S7 | −1.2131E−01 | 8.0581E−02 | −1.7907E−01 | 8.2865E−02 | 0.0000E+00 | 0.0000E+00 | 0.0000E+00 | 0.0000E+00 |
| S8 | −1.8170E−01 | 2.9137E−01 | −2.9295E−01 | 9.8559E−02 | 0.0000E+00 | 0.0000E+00 | 0.0000E+00 | 0.0000E+00 |
| S9 | −3.1840E−01 | 7.2947E−01 | −6.8584E−01 | 3.1543E−01 | −6.0400E−02 | 0.0000E+00 | 0.0000E+00 | 0.0000E+00 |
| S10 | −2.6182E−01 | 5.1702E−01 | −7.1956E−01 | 6.6276E−01 | −3.4866E−01 | 9.7940E−02 | −1.3020E−02 | 5.3900E−04 |
| S11 | 2.3853E−01 | −3.5761E−01 | 2.3281E−01 | −1.2828E−01 | 6.6553E−02 | −2.7790E−02 | 7.0790E−03 | −7.5000E−04 |
| S12 | 1.5437E−01 | −2.1904E−01 | 1.1381E−01 | −3.5650E−02 | 5.9260E−03 | −1.6000E−04 | −7.7000E−05 | 6.0600E−06 |
| S13 | −4.3717E−01 | 3.5984E−01 | −2.3114E−01 | 1.0537E−01 | −2.9850E−02 | 4.9630E−03 | −4.4000E−04 | 1.6500E−05 |
| S14 | −2.4568E−01 | 1.9034E−01 | −1.1936E−01 | 4.9854E−02 | −1.2750E−02 | 1.8990E−03 | −1.5000E−04 | 4.8700E−06 |

Figure 32:
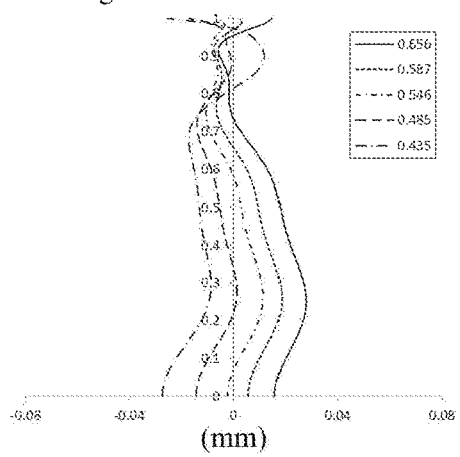
FIGS. 32-35 respectively illustrate a longitudinal aberration curve, an astigmatic curve, a distortion curve and a lateral color curve of the camera lens assembly according to Embodiment 7.
Figure 33:
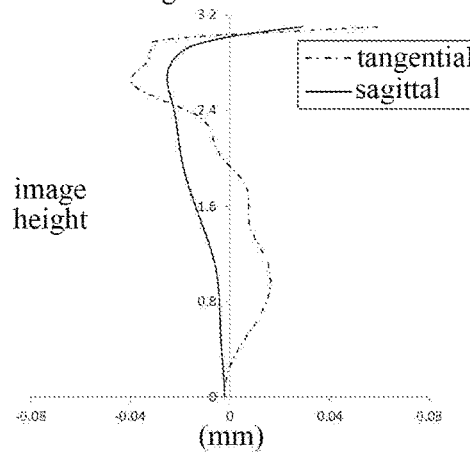
Figure 34:
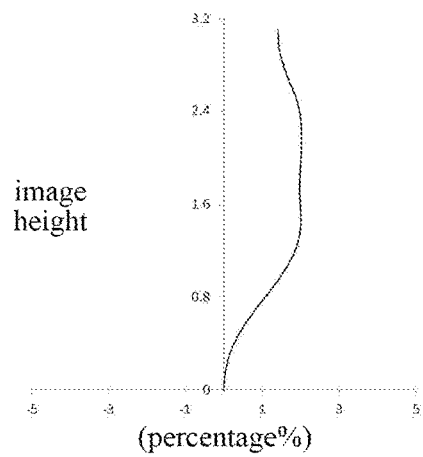
Figure 35:
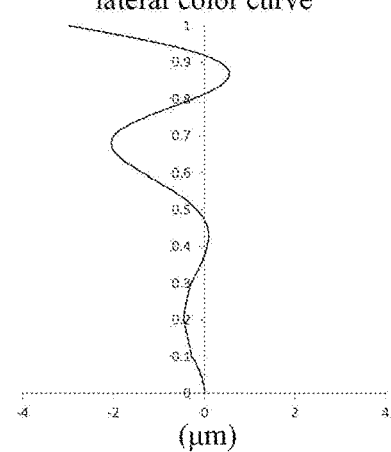

FIG. 32 shows the longitudinal aberration curve of the camera lens assembly according to Embodiment 7, representing deviations of focal points where lights of different wavelengths converge after passing through the optical system. FIG. 33 shows the astigmatic curve of the camera lens assembly according to Embodiment 7, representing a curvature of the tangential image plane and a curvature of the sagittal image plane. FIG. 34 shows the distortion curve of the camera lens assembly according to Embodiment 7, representing degrees of distortion at different viewing angles. FIG. 35 shows the lateral color curve of the camera lens assembly according to Embodiment 7, representing deviations of different heights of images formed on the image plane by light passing through the camera lens assembly. In summary, as can be seen with reference to FIGS. 31 to 35, the camera lens assembly according to Embodiment 7 is suitable for a portable electronic product and having a large aperture, good imaging quality, and low sensitivity.

Embodiment 8

A camera lens assembly according to Embodiment 8 of the present disclosure is described with reference to FIGS. 36 to 40.

Figure 36:
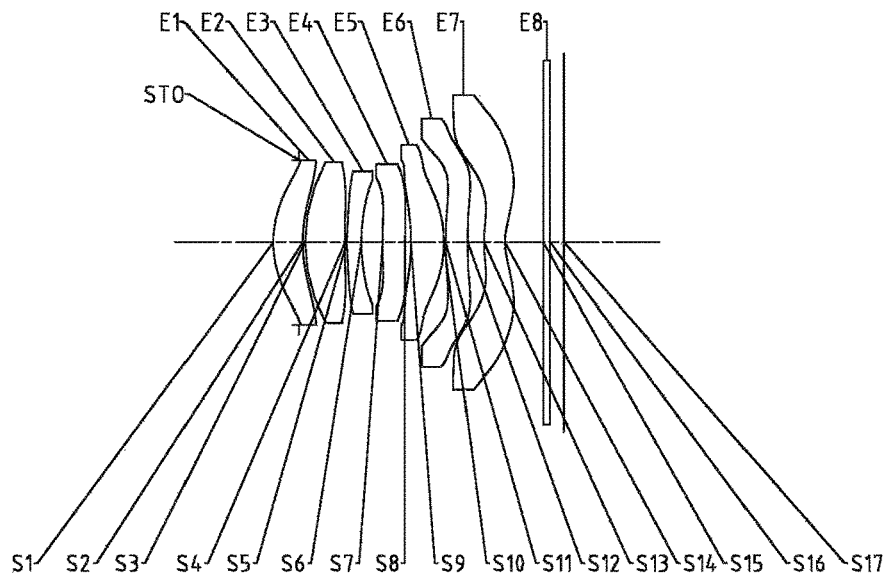
FIG. 36 is a schematic structural diagram illustrating a camera lens assembly according to Embodiment 8.

FIG. 36 is a schematic structural diagram illustrating the camera lens assembly according to Embodiment 8. The camera lens assembly includes, sequentially from an object side to an image side, a first lens E1, a second lens E2, a third lens E3, a fourth lens E4, a fifth lens E5, a sixth lens E6, and a seventh lens E7.

The first lens E1 may have a positive refractive power, the object-side surface S1 of the first lens E1 may be a convex surface, and the image-side surface S2 of the first lens E1 is a concave surface.

The second lens E2 may have a positive refractive power, the object-side surface S3 of the second lens E2 may be a convex surface, and the image-side surface S4 of the second lens E2 may be a concave surface.

The third lens E3 may have a negative refractive power, the object-side surface S5 of the third lens E3 may be a convex surface, and the image-side surface S6 of the third lens E3 may be a concave surface.

The fourth lens E4 may have a negative refractive power, the object-side surface S7 of the fourth lens E4 may be a convex surface, and the image-side surface S8 of the fourth lens E4 may be a concave surface.

The fifth lens E5 may have a positive refractive power, the object-side surface S9 of the fifth lens E5 may be a concave surface, and the image-side surface S10 of the fifth lens E5 may be a convex surface.

The sixth lens E6 may have a positive refractive power, the object-side surface S11 of the sixth lens E6 may be a convex surface, and the image-side surface S12 of the sixth lens E6 may be a concave surface.

The seventh lens E7 may have a negative refractive power, the object-side surface S13 of the seventh lens E7 may be a convex surface, and the image-side surface S14 of the seventh lens E7 may be a concave surface.

Table 22 below shows the effective focal lengths f1 to f7 of the first to seventh lenses E1 to E7, the total effective focal length f of the camera lens assembly, the total track length TTL of the camera lens assembly, and the half ImgH of the diagonal length of the effective pixel area of the electronic light sensing element.

TABLE 22

| | | | |
|---|---|---|---|
| f1(mm) | 8.46 | f(mm) | 3.80 |
| f2(mm) | 6.28 | TTL(mm) | 4.80 |
| f3(mm) | −15.48 | ImgH(mm) | 3.10 |
| f4(mm) | −162.47 | | |
| f5(mm) | 6.87 | | |
| f6(mm) | 36.80 | | |
| f7(mm) | −4.65 | | |

Table 23 shows the surface type, the radius of curvature, the thickness, the material and the conic coefficient of each lens of the camera lens assembly in the present embodiment. The units of the radius of curvature and the thickness are millimeters (mm).

TABLE 23

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.4264 | | | |
| S1 | aspheric | 1.7541 | 0.4866 | 1.55 | 56.1 | −0.4827 |
| S2 | aspheric | 2.5496 | 0.0400 | | | −4.3482 |
| S3 | spherical | 2.7606 | 0.6615 | 1.55 | 56.1 | 0.0000 |
| S4 | aspheric | 12.9050 | 0.0300 | | | 29.1569 |
| S5 | aspheric | 4.2377 | 0.2400 | 1.66 | 20.4 | −28.4457 |
| S6 | aspheric | 2.9372 | 0.3519 | | | 4.4691 |
| S7 | aspheric | 9.2220 | 0.3695 | 1.66 | 20.4 | 63.0000 |
| S8 | aspheric | 8.3631 | 0.0957 | | | −79.9000 |
| S9 | aspheric | −4.8009 | 0.5476 | 1.55 | 56.1 | −34.5134 |
| S10 | aspheric | −2.1911 | 0.0300 | | | −6.3601 |
| S11 | aspheric | 8.2753 | 0.3548 | 1.66 | 20.4 | −79.9000 |
| S12 | aspheric | 12.2648 | 0.2685 | | | 18.1993 |
| S13 | aspheric | 1.9611 | 0.3477 | 1.58 | 36.1 | −7.4053 |
| S14 | aspheric | 1.0634 | 0.6350 | | | −6.3193 |
| S15 | spherical | infinite | 0.1100 | 1.52 | 64.2 | |
| S16 | spherical | infinite | 0.2311 | | | |
| S17 | spherical | infinite | | | | |

Table 24 below shows the high-order coefficients applicable to the aspheric surfaces S1-S14 of the aspheric lenses in the present embodiment. The surface type of each aspheric surface may be defined by the formula (1) given in the above Embodiment 1.

TABLE 24

| surface number | A4 | A6 | A8 | A10 | A12 | A1 | A16 | A18 |
|---|---|---|---|---|---|---|---|---|
| S1 | −1.0940E−02 | 3.0015E−02 | −8.3650E−02 | 9.7821E−02 | −6.6960E−02 | 2.2149E−02 | −2.7100E−03 | 0.0000E+00 |
| S2 | 1.2361E−02 | −1.7370E−02 | −6.4500E−03 | −1.4600E−03 | 2.5060E−03 | 0.0000E+00 | 0.0000E+00 | 0.0000E+00 |
| S4 | −1.3450E−01 | 2.7675E−01 | −2.7570E−01 | 5.0183E−02 | 8.3556E−02 | −5.3400E−02 | 9.5160E−03 | 0.0000E+00 |
| S5 | −1.1913E−01 | 2.3704E−01 | −1.6111E−01 | −1.1682E−01 | 2.1987E−01 | −9.7610E−02 | 1.3136E−02 | 0.0000E+00 |
| S6 | −8.5200E−02 | 6.6576E−02 | −5.4800E−03 | −7.7290E−02 | 8.5709E−02 | −3.8990E−02 | 1.5153E−02 | 0.0000E+00 |
| S7 | −1.1680E−01 | 2.5694E−02 | −1.0344E−01 | 4.7546E−02 | 0.0000E+00 | 0.0000E+00 | 0.0000E+00 | 0.0000E+00 |
| S8 | −1.1742E−01 | 1.0506E−01 | −9.2900E−02 | 2.8104E−02 | 0.0000E+00 | 0.0000E+00 | 0.0000E+00 | 0.0000E+00 |
| S9 | −1.8274E−01 | 3.2529E−01 | −2.4349E−01 | 1.0411E−01 | −2.1510E−02 | 0.0000E+00 | 0.0000E+00 | 0.0000E+00 |
| S10 | −1.8189E−01 | 1.3050E−01 | 1.3528E−01 | −4.3034E−01 | 4.6529E−01 | −2.4619E−01 | 6.3500E−02 | −6.4057E−03 |
| S11 | 1.0432E−01 | −2.6138E−01 | 3.2019E−01 | −3.1876E−01 | 2.0681E−01 | −8.2120E−02 | 1.8206E−02 | −1.7030E−03 |

TABLE 24-continued

| surface number | A4 | A6 | A8 | A10 | A12 | A1 | A16 | A18 |
|---|---|---|---|---|---|---|---|---|
| S12 | 1.0859E−01 | −2.0669E−01 | 1.6462E−01 | −1.0174E−01 | 4.1277E−02 | −9.6300E−03 | 1.1800E−03 | −5.9655E−05 |
| S13 | −5.1651E−01 | 4.9191E−01 | −3.7849E−01 | 1.9806E−01 | −6.2510E−02 | 1.1454E−02 | −1.1300E−03 | 4.6300E−05 |
| S14 | −2.4275E−01 | 1.9470E−01 | −1.2615E−01 | 5.5675E−02 | −1.5250E−02 | 2.4500E−03 | −2.1000E−04 | 7.5373E−06 |

Figure 37:
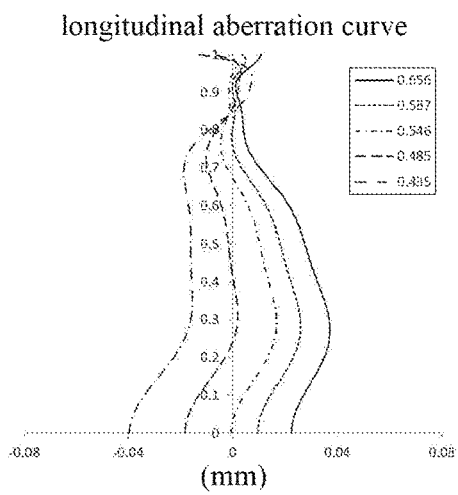
FIGS. 37-40 respectively illustrate a longitudinal aberration curve, an astigmatic curve, a distortion curve and a lateral color curve of the camera lens assembly according to Embodiment 8.
Figure 38:
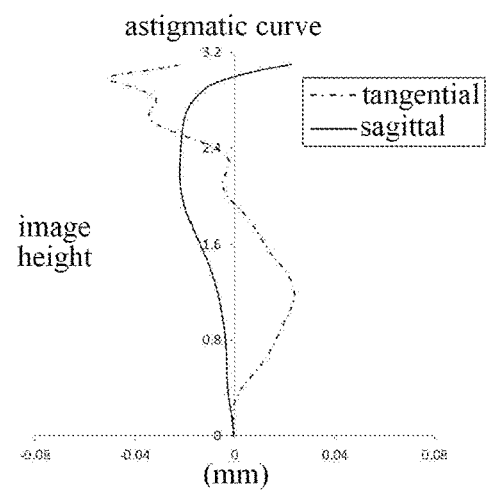
Figure 39:
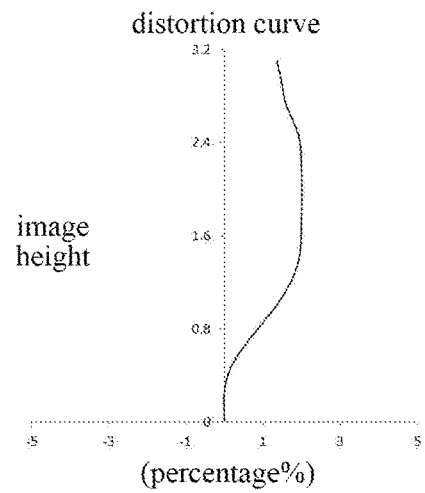
Figure 40:
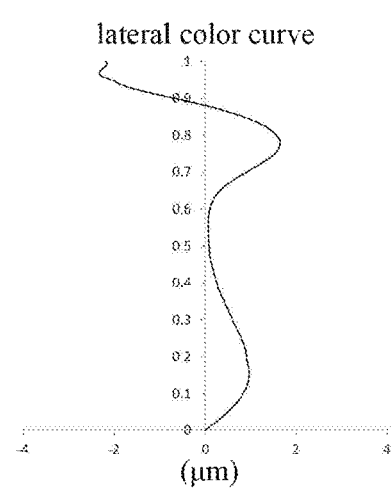

FIG. 37 shows the longitudinal aberration curve of the camera lens assembly according to Embodiment 8, representing deviations of focal points where lights of different wavelengths converge after passing through the optical system. FIG. 38 shows the astigmatic curve of the camera lens assembly according to Embodiment 8, representing a curvature of the tangential image plane and a curvature of the sagittal image plane. FIG. 39 shows the distortion curve of the camera lens assembly according to Embodiment 8, representing degrees of distortion at different viewing angles. FIG. 40 shows the lateral color curve of the camera lens assembly according to Embodiment 8, representing deviations of different heights of images formed on the image plane by light passing through the camera lens assembly. In summary, as can be seen with reference to FIGS. 36 to 40, the camera lens assembly according to Embodiment 8 is suitable for a portable electronic product and having a large aperture, good imaging quality, and low sensitivity.

Embodiment 9

A camera lens assembly according to Embodiment 9 of the present disclosure is described with reference to FIGS. 41 to 45.

Figure 41:
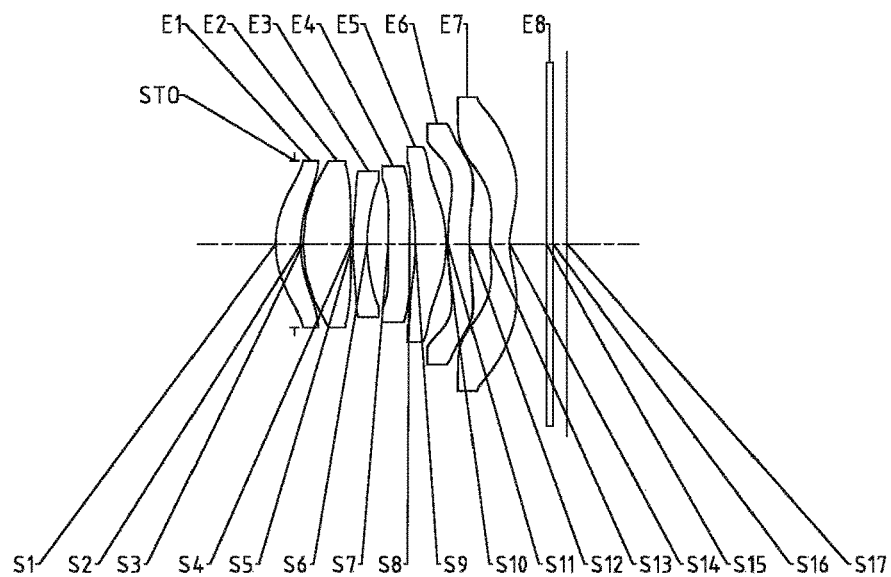
FIG. 41 is a schematic structural diagram illustrating a camera lens assembly according to Embodiment 9.

FIG. 41 is a schematic structural diagram illustrating the camera lens assembly according to Embodiment 9. The camera lens assembly includes, sequentially from an object side to an image side, a first lens E1, a second lens E2, a third lens E3, a fourth lens E4, a fifth lens E5, a sixth lens E6, and a seventh lens E7.

The first lens E1 may have a positive refractive power, the object-side surface S1 of the first lens E1 may be a convex surface, and the image-side surface S2 of the first lens E1 is a concave surface.

The second lens E2 may have a positive refractive power, the object-side surface S3 of the second lens E2 may be a convex surface, and the image-side surface S4 of the second lens E2 may be a concave surface.

The third lens E3 may have a negative refractive power, the object-side surface S5 of the third lens E3 may be a convex surface, and the image-side surface S6 of the third lens E3 may be a concave surface.

The fourth lens E4 may have a negative refractive power, the object-side surface S7 of the fourth lens E4 may be a convex surface, and the image-side surface S8 of the fourth lens E4 may be a concave surface.

The fifth lens E5 may have a positive refractive power, the object-side surface S9 of the fifth lens E5 may be a concave surface, and the image-side surface S10 of the fifth lens E5 may be a convex surface.

The sixth lens E6 may have a positive refractive power, the object-side surface S11 of the sixth lens E6 may be a convex surface, and the image-side surface S12 of the sixth lens E6 may be a concave surface.

The seventh lens E7 may have a negative refractive power, the object-side surface S13 of the seventh lens E7 may be a convex surface, and the image-side surface S14 of the seventh lens E7 may be a concave surface.

Table 25 below shows the effective focal lengths f1 to f7 of the first to seventh lenses E1 to E7, the total effective focal length f of the camera lens assembly, the total track length TTL of the camera lens assembly, and the half ImgH of the diagonal length of the effective pixel area of the electronic light sensing element.

TABLE 25

| f1(mm) | 12.37 | f(mm) | 3.85 |
|---|---|---|---|
| f2(mm) | 4.99 | TTL(mm) | 4.80 |
| f3(mm) | −15.00 | ImgH(mm) | 3.10 |
| f4(mm) | −54.60 | | |
| f5(mm) | 6.28 | | |
| f6(mm) | 103.14 | | |
| f7(mm) | −4.58 | | |

Table 26 shows the surface type, the radius of curvature, the thickness, the material and the conic coefficient of each lens of the camera lens assembly in the present embodiment. The units of the radius of curvature and the thickness are millimeters (mm).

TABLE 26

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3136 | | | |
| S1 | aspheric | 1.6777 | 0.4120 | 1.55 | 56.1 | −0.5407 |
| S2 | aspheric | 2.0378 | 0.0400 | | | −2.8699 |
| S3 | spherical | 2.4555 | 0.7887 | 1.55 | 56.1 | 0.0000 |
| S4 | aspheric | 22.0035 | 0.0300 | | | −72.3900 |
| S5 | aspheric | 3.6907 | 0.2400 | 1.66 | 20.4 | −79.9000 |
| S6 | aspheric | 2.6268 | 0.3469 | | | 4.4981 |
| S7 | aspheric | 10.4353 | 0.3510 | 1.66 | 20.4 | 63.0000 |
| S8 | aspheric | 8.0037 | 0.0970 | | | −79.9000 |
| S9 | aspheric | −5.0147 | 0.5106 | 1.55 | 56.1 | −50.7463 |
| S10 | aspheric | −2.1110 | 0.0300 | | | −6.1206 |

TABLE 26-continued

| surface number | surface type | radius of curvature | thickness | refractive index | abbe number | conic coefficient |
|---|---|---|---|---|---|---|
| S11 | aspheric | 4.8792 | 0.3519 | 1.66 | 20.4 | −79.9000 |
| S12 | aspheric | 5.0997 | 0.3322 | | | −17.4982 |
| S13 | aspheric | 2.2288 | 0.3200 | 1.59 | 32.3 | −12.9125 |
| S14 | aspheric | 1.1612 | 0.6090 | | | −7.3516 |
| S15 | spherical | infinite | 0.1100 | 1.52 | 64.2 | |
| S16 | spherical | infinite | 0.2311 | | | |
| S17 | spherical | infinite | | | | |

Table 27 below shows the high-order coefficients applicable to the aspheric surfaces S1-S14 of the aspheric lenses in the present embodiment. The surface type of each aspheric surface may be defined by the formula (1) given in the above Embodiment 1.

TABLE 27

| surface number | A4 | A6 | A8 | A10 | A12 | A1 | A16 | A18 |
|---|---|---|---|---|---|---|---|---|
| S1 | −4.8600E−03 | 5.5470E−03 | −3.7140E−02 | 4.0294E−02 | −2.6159E−02 | 6.3070E−03 | −1.9000E−04 | 0.0000E+00 |
| S2 | 2.6296E−02 | −3.2060E−02 | 1.4204E−02 | −1.8220E−02 | 6.1653E−03 | 0.0000E+00 | 0.0000E+00 | 0.0000E+00 |
| S4 | −1.3544E−01 | 3.2381E−01 | −5.1523E−01 | 4.3718E−01 | −2.0020E−01 | 4.6018E−02 | −4.0300E−03 | 0.0000E+00 |
| S5 | 1.8981E−02 | −9.5870E−02 | 2.8955E−01 | −6.4099E−01 | 6.8769E−01 | −3.3590E−01 | 6.2245E−02 | 0.0000E+00 |
| S6 | −1.0852E−01 | 1.5162E−01 | −4.3899E−01 | 8.0845E−01 | −1.0002E+00 | 6.9471E−01 | −1.9771E−01 | 0.0000E+00 |
| S7 | −1.3527E−01 | 9.6878E−02 | −1.3961E−01 | 5.5385E−02 | 0.0000E+00 | 0.0000E+00 | 0.0000E+00 | 0.0000E+00 |
| S8 | −1.5707E−01 | 1.6389E−01 | −1.1139E−01 | 2.8748E−02 | 0.0000E+00 | 0.0000E+00 | 0.0000E+00 | 0.0000E+00 |
| S9 | −1.5258E−01 | 2.7141E−01 | −1.8299E−01 | 6.9543E−02 | −1.4464E−02 | 0.0000E+00 | 0.0000E+00 | 0.0000E+00 |
| S10 | −4.4000E−02 | −9.6080E−02 | 4.3757E−01 | −7.3837E−01 | 6.7557E−01 | −3.3565E−01 | 8.4681E−02 | −8.5100E−03 |
| S11 | 1.1453E−01 | −2.3493E−01 | 2.5205E−01 | −2.4651E−01 | 1.6353E−01 | −6.6810E−02 | 1.5142E−02 | −1.4300E−03 |
| S12 | −1.8120E−02 | 5.1303E−02 | −1.3242E−01 | 1.1297E−01 | −5.5670E−02 | 1.6522E−02 | −2.6400E−03 | 1.7200E−04 |
| S13 | −5.2400E−01 | 5.3076E−01 | −4.1963E−01 | 2.2151E−01 | −7.0210E−02 | 1.2890E−02 | −1.2700E−03 | 5.1900E−05 |
| S14 | −2.6242E−01 | 2.2518E−01 | −1.4955E−01 | 6.6056E−02 | −1.8050E−02 | 2.9140E−03 | −2.6000E−04 | 9.3900E−06 |

Figure 42:
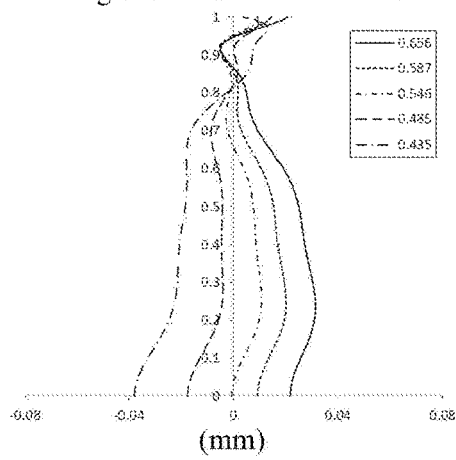
FIGS. 42-45 respectively illustrate a longitudinal aberration curve, an astigmatic curve, a distortion curve and a lateral color curve of the camera lens assembly according to Embodiment 9.
Figure 43:
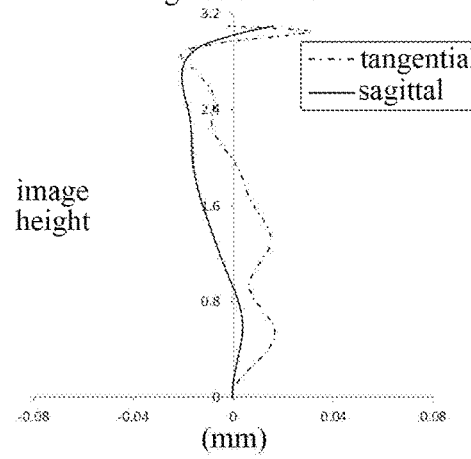
Figure 44:
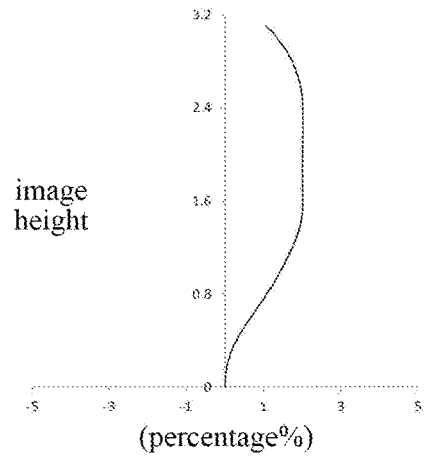
Figure 45:
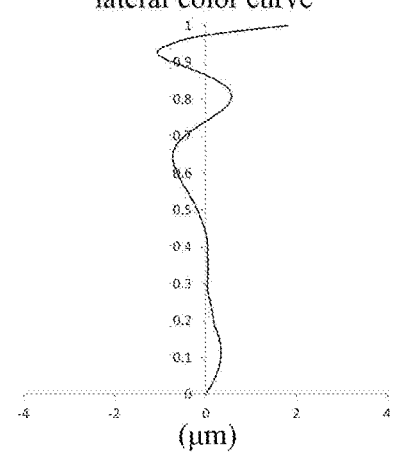

FIG. 42 shows the longitudinal aberration curve of the camera lens assembly according to Embodiment 9, representing deviations of focal points where lights of different wavelengths converge after passing through the optical system. FIG. 43 shows the astigmatic curve of the camera lens assembly according to Embodiment 9, representing a curvature of the tangential image plane and a curvature of the sagittal image plane. FIG. 44 shows the distortion curve of the camera lens assembly according to Embodiment 9, representing degrees of distortion at different viewing angles. FIG. 45 shows the lateral color curve of the camera lens assembly according to Embodiment 9, representing deviations of different heights of images formed on the image plane by light passing through the camera lens assembly. In summary, as can be seen with reference to FIGS. 41 to 45, the camera lens assembly according to Embodiment 9 is suitable for a portable electronic product and having a large aperture, good imaging quality, and low sensitivity.

To sum up, in the above Embodiments 1 to 9, the conditional expressions satisfy the conditions in Table 28 below.

TABLE 28

| | embodiment | | | | | | | | |
|---|---|---|---|---|---|---|---|---|---|
| conditional expression | 1 | 2 | 3 | 4 | 5 | 6 | 7 | 8 | 9 |
| f/EPD | 1.57 | 1.57 | 1.57 | 1.57 | 1.58 | 1.50 | 1.45 | 1.40 | 1.40 |
| (V2 + V7)/(V3 + V4 + V6) | 1.72 | 1.15 | 1.15 | 1.83 | 1.12 | 1.83 | 1.83 | 1.51 | 1.44 |
| EPD/ImgH | 0.78 | 0.78 | 0.78 | 0.79 | 0.76 | 0.81 | 0.86 | 0.87 | 0.89 |
| |(R4 − R7)/(R4 + R7)| | 0.94 | 1.00 | 1.30 | 1.00 | 0.05 | 1.01 | 0.12 | 0.17 | 0.36 |
| (R8 − R14)/(R8 + R14) | 0.72 | 1.00 | 1.04 | 1.00 | 0.99 | 1.00 | 0.87 | 0.77 | 0.75 |
| f1/f | 2.64 | 2.72 | 2.60 | 1.94 | 4.70 | 1.91 | 1.94 | 2.23 | 3.21 |
| f1/f2 | 2.05 | 2.24 | 2.09 | 1.31 | 4.21 | 1.08 | 1.16 | 1.35 | 2.48 |
| T25/T56 | 1.00 | 1.00 | 0.90 | 1.00 | 0.31 | 1.00 | 1.00 | 1.00 | 1.00 |
| f/R9 | −0.04 | −0.49 | −0.65 | −0.68 | −0.67 | −0.72 | −0.65 | −0.79 | −0.77 |
| R1/R9 | −0.02 | −0.22 | −0.28 | −0.31 | −0.29 | −0.32 | −0.29 | −0.37 | −0.33 |
| f/R12 | 0.64 | 0.78 | 0.69 | 0.53 | 0.92 | 0.50 | 0.46 | 0.31 | 0.76 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar function.

What is claimed is:

1. A camera lens assembly sequentially comprising, from an object side to an image side:
    a first lens having a positive refractive power, and an object-side surface of the first lens being a convex surface;
    a second lens having a positive refractive power;
    a third lens having a refractive power;
    a fourth lens;
    a fifth lens having a refractive power, an object-side surface of the fifth lens being a concave surface, and an image-side surface of the fifth lens being a convex surface;
    a sixth lens having a refractive power, and an image-side surface of the sixth lens being a concave surface;
    a seventh lens having a negative refractive power, and an image-side surface of the seventh lens being a concave surface; and
    wherein an effective focal length f of the camera lens assembly and an entrance pupil diameter EPD of the camera lens assembly satisfy: $f/EPD \leq 1.60$.

2. The camera lens assembly according to claim 1, wherein the fourth lens has a refractive power, wherein an effective focal length f1 of the first lens and an effective focal length f2 of the second lens satisfy: $1 \leq f1/f2 < 5$.

3. The camera lens assembly according to claim 2, wherein a radius R4 of curvature of an image-side surface of the second lens and a radius R7 of curvature of an object-side surface of the fourth lens satisfy: $|(R4-R7)/(R4+R7)| < 1.5$, wherein a radius R8 of curvature of an image-side surface of the fourth lens and a radius R14 of curvature of the image-side surface of the seventh lens satisfy: $0 < (R8-R14)/(R8+R14) < 2$.

4. The camera lens assembly according to claim 1, wherein an abbe number V2 of the second lens, an abbe number V3 of the third lens, an abbe number V4 of the fourth lens, an abbe number V6 of the sixth lens, and an abbe number V7 of the seventh lens satisfy: $1 < (V2+V7)/(V3+V4+V6) < 2$.

5. The camera lens assembly according to claim 1, wherein the entrance pupil diameter EPD of the camera lens assembly and a half ImgH of a diagonal length of an effective pixel area on an image plane satisfy: $EPD/ImgH \geq 0.75$.

6. The camera lens assembly according to claim 1, wherein the effective focal length f of the camera lens assembly and an effective focal length f1 of the first lens satisfy: $1.5 < f1/f < 5$.

7. The camera lens assembly according to claim 1, wherein an axial distance T25 between the second lens and the fifth lens and an axial distance T56 between the fifth lens and the sixth lens satisfy: $0 < T25/T56 < 3.5$.

8. The camera lens assembly according to claim 1, wherein the effective focal length f of the camera lens assembly and a radius R9 of curvature of the object-side surface of the fifth lens satisfy: $-1 < f/R9 < 0$, wherein a radius R1 of curvature of the object-side surface of the first lens and a radius R9 of curvature of the object-side surface of the fifth lens satisfy: $-0.5 < R1/R9 < 0$, wherein the effective focal length f of the camera lens assembly and a radius R12 of curvature of the image-side surface of the sixth lens satisfy: $0 < f/R12 < 1$.

9. A camera lens assembly sequentially comprising, from an object side to an image side:
    a first lens having a positive refractive power;
    a second lens having a positive refractive power;
    a third lens having a refractive power;
    a fourth lens;
    a fifth lens having a refractive power;
    a sixth lens having a refractive power;
    a seventh lens having a negative refractive power; and
    wherein an abbe number V2 of the second lens, an abbe number V3 of the third lens, an abbe number V4 of the fourth lens, an abbe number V6 of the sixth lens, and an abbe number V7 of the seventh lens satisfy: $1 < (V2+V7)/(V3+V4+V6) < 2$,
    wherein a radius R4 of curvature of an image-side surface of the second lens and a radius R7 of curvature of an object-side surface of the fourth lens satisfy: $|(R4-R7)/(R4+R7)| < 1.5$.

10. The camera lens assembly according to claim 9, wherein,
    an object-side surface of the first lens is a convex surface;
    an object-side surface of the fifth lens is a concave surface and an image-side surface of the fifth lens is a convex surface;
    an image-side surface of the sixth lens is a concave surface; and
    an image-side surface of the seventh lens is a concave surface.

11. The camera lens assembly according to claim 9, wherein the fourth lens has a refractive power, wherein an entrance pupil diameter EPD of the camera lens assembly and a half ImgH of a diagonal length of an effective pixel area on an image plane satisfy: $EPD/ImgH \geq 0.75$.

12. The camera lens assembly according to claim 11, wherein an effective focal length f of the camera lens assembly and the entrance pupil diameter EPD of the camera lens assembly satisfy: $f/EPD \leq 1.60$.

13. The camera lens assembly according to claim 9, wherein an effective focal length f1 of the first lens and an effective focal length f2 of the second lens satisfy: $1 \leq f1/f2 < 5$.

14. The camera lens assembly according to claim 9, wherein a radius R8 of curvature of an image-side surface of the fourth lens and a radius R14 of curvature of an image-side surface of the seventh lens satisfy: $0 < (R8-R14)/(R8+R14) < 2$.

15. The camera lens assembly according to claim 9, wherein an effective focal length f of the camera lens assembly and an effective focal length f1 of the first lens satisfy: $1.5 < f1/f < 5$.

16. The camera lens assembly according to claim 9, wherein an axial distance T25 between the second lens and the fifth lens and an axial distance T56 between the fifth lens and the sixth lens satisfy: $0 < T25/T56 < 3.5$.

17. The camera lens assembly according to claim 9, wherein an effective focal length f of the camera lens assembly and a radius R9 of curvature of an object-side surface of the fifth lens satisfy: $-1 < f/R9 < 0$, wherein a radius R1 of curvature of the object-side surface of the first lens and a radius R9 of curvature of the object-side surface of the fifth lens satisfy: −0.5<R1/R9<0, wherein the effective focal length f of the camera lens assembly and a radius R12 of curvature of the image-side surface of the sixth lens satisfy: 0<f/R12<1.

18. A camera lens assembly sequentially comprising, from an object side to an image side:
   a first lens having a positive refractive power, and an object-side surface of the first lens being a convex surface;
   a second lens having a positive refractive power;
   a third lens having a refractive power;
   a fourth lens;
   a fifth lens having a refractive power, an object-side surface of the fifth lens being a concave surface, and an image-side surface of the fifth lens being a convex surface;
   a sixth lens having a refractive power, and an image-side surface of the sixth lens being a concave surface;
   a seventh lens having a negative refractive power, and an image-side surface of the seventh lens being a concave surface; and
   wherein an effective focal length f1 of the first lens and an effective focal length f2 of the second lens satisfy: 1≤f1/f2<5,
   wherein an entrance pupil diameter EPD of the camera lens assembly and a half ImgH of a diagonal length of an effective pixel area on an image plane satisfy: EPD/ImgH≥0.75.

19. The camera lens assembly according to claim 18, wherein the fourth lens has a refractive power, wherein a radius R4 of curvature of an image-side surface of the second lens and a radius R7 of curvature of an object-side surface of the fourth lens satisfy: |(R4−R7)/(R4+R7)|<1.5, wherein an effective focal length f of the camera lens assembly and an entrance pupil diameter EPD of the camera lens assembly satisfy: f/EPD≤1.60, wherein an abbe number V2 of the second lens, an abbe number V3 of the third lens, an abbe number V4 of the fourth lens, an abbe number V6 of the sixth lens, and an abbe number V7 of the seventh lens satisfy: 1<(V2+V7)/(V3+V4+V6)<2.

20. The camera lens assembly according to claim 18, wherein a radius R8 of curvature of an image-side surface of the fourth lens and a radius R14 of curvature of the image-side surface of the seventh lens satisfy: 0<(R8−R14)/(R8+R14)<2.

21. The camera lens assembly according to claim 18, wherein an effective focal length f of the camera lens assembly and the effective focal length f1 of the first lens satisfy: 1.5<f1/f<5.

22. The camera lens assembly according to claim 18, wherein an axial distance T25 between the second lens and the fifth lens and an axial distance T56 between the fifth lens and the sixth lens satisfy: 0<T25/T56<3.5.

23. The camera lens assembly according to claim 18, wherein an effective focal length f of the camera lens assembly and a radius R9 of curvature of the object-side surface of the fifth lens satisfy: −1<f/R9<0, wherein a radius R1 of curvature of the object-side surface of the first lens and a radius R9 of curvature of the object-side surface of the fifth lens satisfy: −0.5<R1/R9<0, wherein the effective focal length f of the camera lens assembly and a radius R12 of curvature of the image-side surface of the sixth lens satisfy: 0<f/R12<1.

* * * * *